US012639015B2

(12) United States Patent
Rathor et al.

(10) Patent No.: US 12,639,015 B2
(45) Date of Patent: May 26, 2026

(54) TIME SYNCHRONIZATION ACROSS INDEPENDENT INPUT/OUTPUT SCHEDULERS

(71) Applicant: Rubrik, Inc., Palo Alto, CA (US)

(72) Inventors: Nitin Rathor, Mountain View, CA (US); Keon Jang, Los Altos, CA (US)

(73) Assignee: Rubrik, Inc., Palo Alto, CA (US)

( * ) Notice: Subject to any disclaimer, the term of this patent is extended or adjusted under 35 U.S.C. 154(b) by 164 days.

(21) Appl. No.: 18/140,703

(22) Filed: Apr. 28, 2023

(65) Prior Publication Data

US 2024/0361960 A1     Oct. 31, 2024

(51) Int. Cl.
*G06F 3/06* (2006.01)

(52) U.S. Cl.
CPC .......... *G06F 3/0674* (2013.01); *G06F 3/0613* (2013.01); *G06F 3/0631* (2013.01); *G06F 3/0659* (2013.01)

(58) Field of Classification Search
CPC .............................. G06F 9/4881; G06F 9/5005
See application file for complete search history.

(56) References Cited

U.S. PATENT DOCUMENTS

| | | | |
|---|---|---|---|
| 2005/0044311 A1* | 2/2005 | Lahiri ................. | G06F 12/0804 711/E12.04 |
| 2014/0115719 A1* | 4/2014 | Noda ...................... | G06F 21/62 726/27 |
| 2014/0245299 A1* | 8/2014 | Yadappanavar .......... | G06F 9/50 718/1 |
| 2015/0347327 A1* | 12/2015 | Blaine .................... | G06F 13/18 710/6 |
| 2019/0377610 A1* | 12/2019 | Gupta .................... | G06F 3/061 |
| 2020/0192711 A1* | 6/2020 | Zhang ................... | G06F 9/5005 |
| 2021/0004163 A1* | 1/2021 | Xu ........................ | G06F 9/4881 |

* cited by examiner

*Primary Examiner* — Getente A Yimer
(74) *Attorney, Agent, or Firm* — Holland & Hart LLP

(57) ABSTRACT

Methods, systems, and devices for data management are described. A data management system (DMS) may include multiple disks. A distributed file system may be stored across the multiple disks. The DMS may receive a request to perform a first job for the distributed file system. The DMS may send the first job for execution, during a time period, by a set of disks. The first job may correspond to input/output (I/O) operations associated with a first priority that is higher than second priorities associated with second jobs for execution by the set of disks. Respective timings for executing the second jobs may be based on respective availabilities of resources at the set of disks. The DMS may synchronize, during the time period, the respective availabilities of resources across the set of disks based on the set of disks executing the first job associated with the first priority.

20 Claims, 14 Drawing Sheets

110-c 680-a          680-b          680-c          680-d

Disk 1          Disk 2          Disk 3          Disk 4

Time

Deposition Time

IRR₁₋₁ / IRR$_{1-1}$

IRR$_{1-1}$
IRR$_{1-2}$
IRR$_{1-3}$
NWR
IRR$_{1-4}$
IRR$_{1-5}$
IRR$_{1-6}$

IRR$_{2-1}$
IRR$_{2-2}$
NWR
IRR$_{2-3}$
IRR$_{2-4}$
IRR$_{2-5}$
IRR$_{2-6}$

IRR$_{3-1}$
IRR$_{3-2}$
NWR
IRR$_{3-3}$
IRR$_{3-4}$
IRR$_{3-5}$

IRR$_{4-1}$
IRR$_{4-2}$
NWR
IRR$_{4-3}$
IRR$_{4-4}$
IRR$_{4-5}$

605
Time
Period

IRR$_{d-n}$     Interactive Read
Request of 'n'th Slice on
Disk 'd'

NWR     Non-Interactive
Write Request

600

Figure 12:
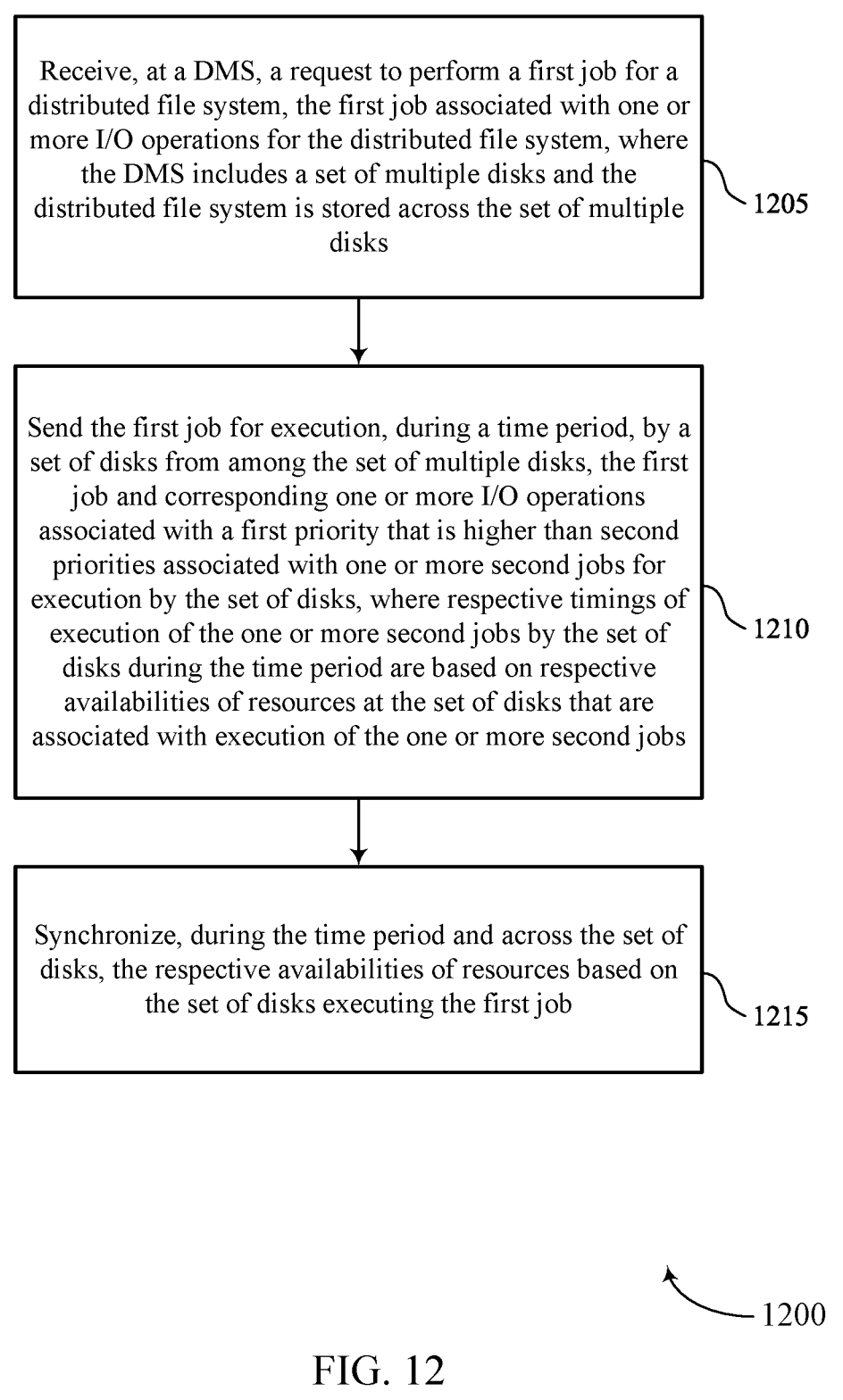

Receive, at a DMS, a request to perform a first job for a distributed file system, the first job associated with one or more I/O operations for the distributed file system, where the DMS includes a set of multiple disks and the distributed file system is stored across the set of multiple disks

1205

Send the first job for execution, during a time period, by a set of disks from among the set of multiple disks, the first job and corresponding one or more I/O operations associated with a first priority that is higher than second priorities associated with one or more second jobs for execution by the set of disks, where respective timings of execution of the one or more second jobs by the set of disks during the time period are based on respective availabilities of resources at the set of disks that are associated with execution of the one or more second jobs

1210

Synchronize, during the time period and across the set of disks, the respective availabilities of resources based on the set of disks executing the first job

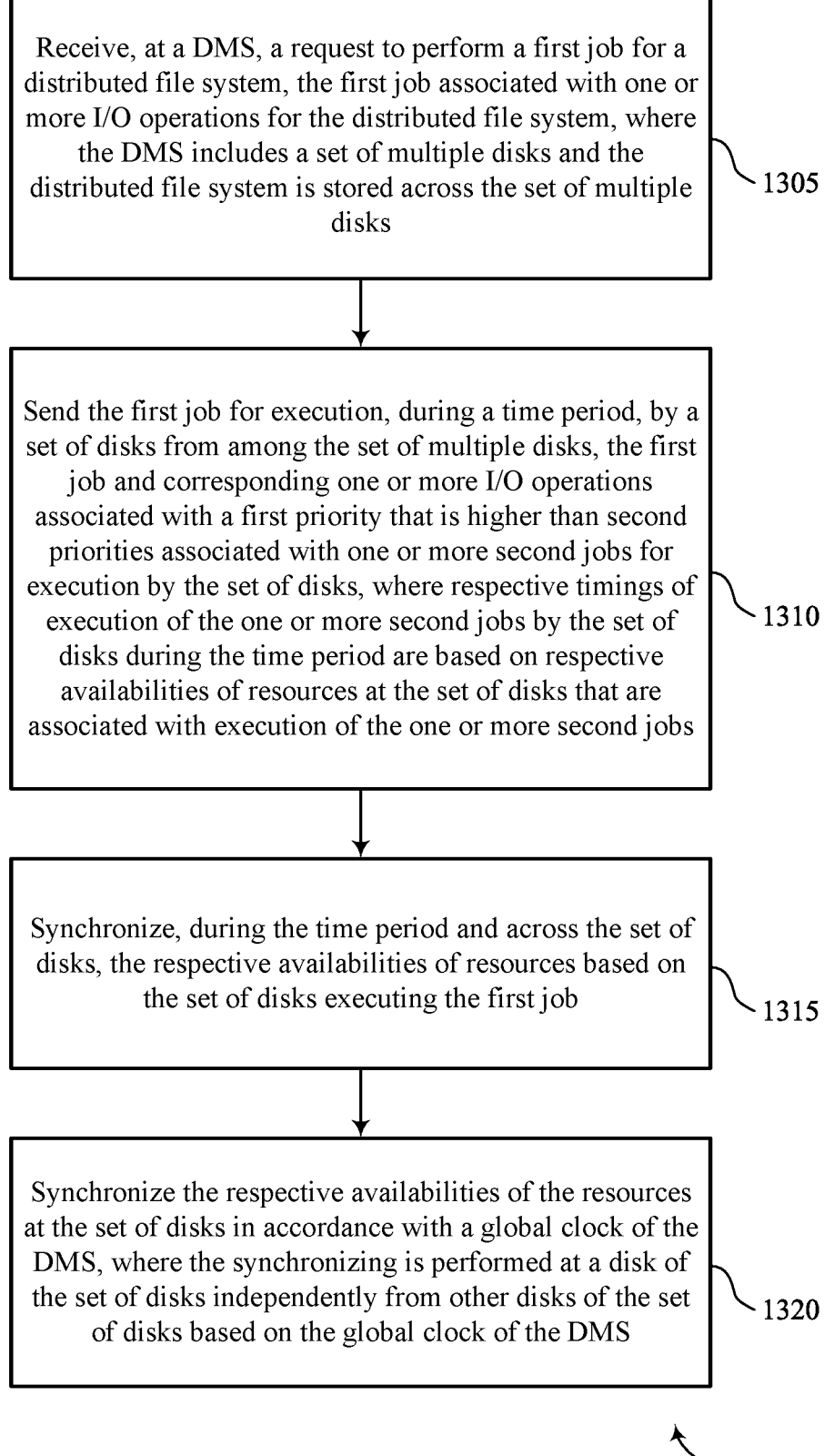

Receive, at a DMS, a request to perform a first job for a distributed file system, the first job associated with one or more I/O operations for the distributed file system, where the DMS includes a set of multiple disks and the distributed file system is stored across the set of multiple disks

1305

Send the first job for execution, during a time period, by a set of disks from among the set of multiple disks, the first job and corresponding one or more I/O operations associated with a first priority that is higher than second priorities associated with one or more second jobs for execution by the set of disks, where respective timings of execution of the one or more second jobs by the set of disks during the time period are based on respective availabilities of resources at the set of disks that are associated with execution of the one or more second jobs

1310

Synchronize, during the time period and across the set of disks, the respective availabilities of resources based on the set of disks executing the first job

1315

Synchronize the respective availabilities of the resources at the set of disks in accordance with a global clock of the DMS, where the synchronizing is performed at a disk of the set of disks independently from other disks of the set of disks based on the global clock of the DMS

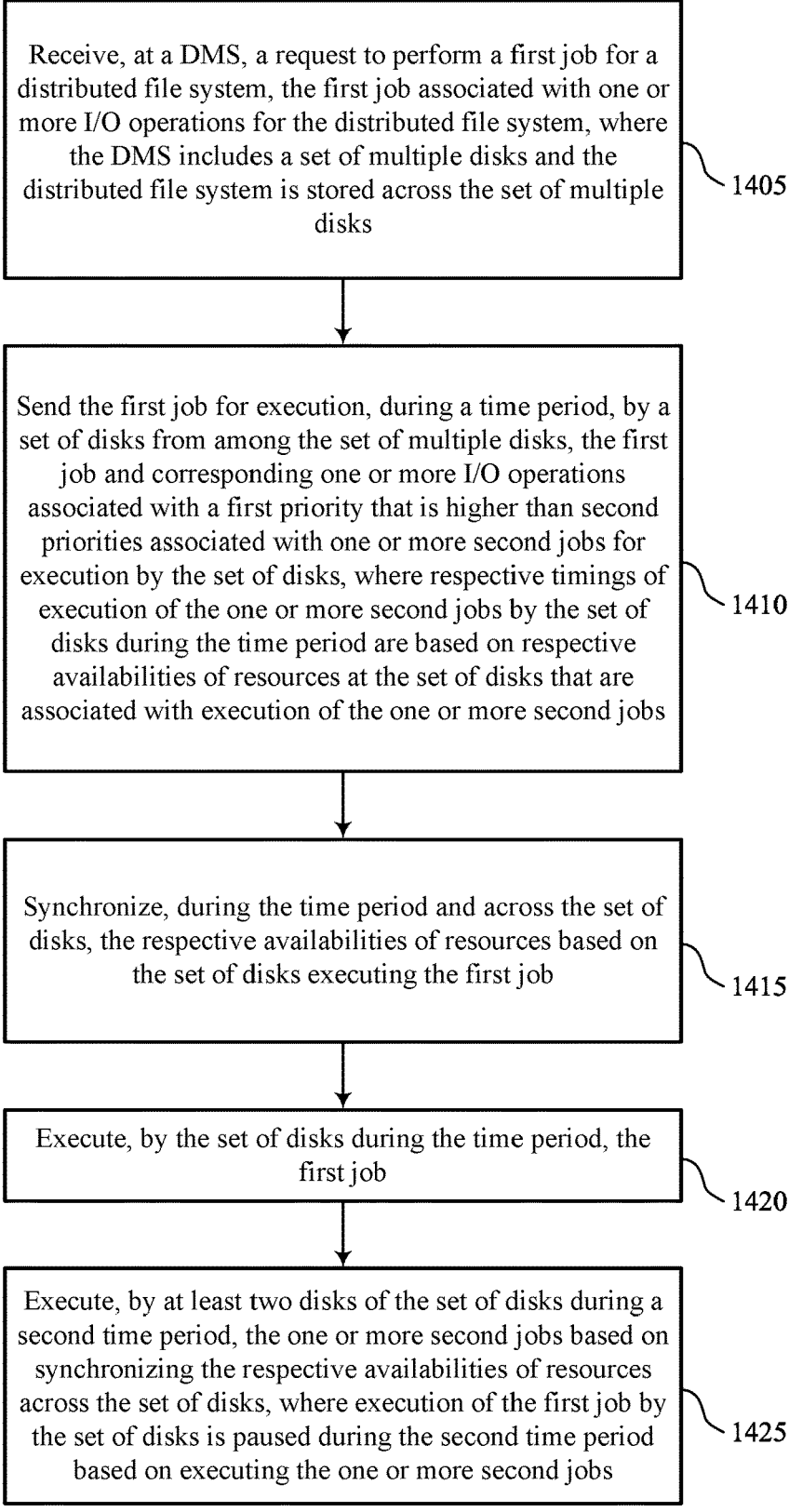

Receive, at a DMS, a request to perform a first job for a distributed file system, the first job associated with one or more I/O operations for the distributed file system, where the DMS includes a set of multiple disks and the distributed file system is stored across the set of multiple disks

1405

Send the first job for execution, during a time period, by a set of disks from among the set of multiple disks, the first job and corresponding one or more I/O operations associated with a first priority that is higher than second priorities associated with one or more second jobs for execution by the set of disks, where respective timings of execution of the one or more second jobs by the set of disks during the time period are based on respective availabilities of resources at the set of disks that are associated with execution of the one or more second jobs

1410

Synchronize, during the time period and across the set of disks, the respective availabilities of resources based on the set of disks executing the first job

1415

Execute, by the set of disks during the time period, the first job

1420

Execute, by at least two disks of the set of disks during a second time period, the one or more second jobs based on synchronizing the respective availabilities of resources across the set of disks, where execution of the first job by the set of disks is paused during the second time period based on executing the one or more second jobs

TIME SYNCHRONIZATION ACROSS INDEPENDENT INPUT/OUTPUT SCHEDULERS

FIELD OF TECHNOLOGY

The present disclosure relates generally to data management, including techniques for time synchronization across independent input/output (I/O) schedulers.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 12 through 14 show flowcharts illustrating methods that support time synchronization across independent I/O schedulers in accordance with aspects of the present disclosure.

DETAILED DESCRIPTION

A data management system (DMS) may manage backup and recovery of data stored in a distributed file system (e.g., a scale data distributed file system (SDFS)) across multiple disks. For example, the DMS may include multiple nodes or clusters each including multiple disks. Each disk may include or be coupled with a corresponding input/output (I/O) scheduler that schedules ordering and timing of submissions of I/Os between several jobs and the disk. The DMS may define priorities for jobs, where higher priority jobs may be referred to as interactive jobs and lower priority jobs may be referred to as non-interactive jobs. An I/O scheduler for a given disk may schedule interactive I/O requests unconditionally, and may conditionally schedule non-interactive I/O requests based on an availability of computing resources of the disk (also referred to as tokens). The I/O scheduler for each disk in the system may deposit (e.g., make available) new computing resources periodically. At each disk, execution of non-interactive I/O requests may be throttled to prioritize higher priority I/O jobs until new resources are deposited. As read or write jobs may occur across disks, throttling at one disk may cause delay and/or idle time at other disks.

Techniques, systems, and devices described herein provide for synchronization of resource deposition across multiple I/O schedulers that are associated with disks performing a same interactive job. That is, if the DMS receives a request to perform an interactive job, and the interactive job involves a read or a write to multiple disks of the DMS, the DMS may indicate, to the I/O schedulers of the disks, to synchronize resource deposition at least during execution of the interactive job. By synchronizing resource deposition, the I/O schedulers may deposit additional resources at or around the same time (e.g., according to a same deposition periodicity, which may be aligned or synchronized in time). As such, each of the I/O schedulers may deposit additional resources and perform one or more non-interactive jobs based on the resource deposition within a same time period, which may pause execution of the interactive job at each of the disks during the time period.

The different disks may perform the interactive job, including one or more read or write operations, consecutively, such that the synchronized deposition of resources across disks may reduce a likelihood that one or more disks are idle while another disk completes a non-interactive job, as the synchronized deposition of resources increases the likelihood that the I/O schedulers will synchronize completion of non-interactive jobs across the disks. Reduced disk idle time may reduce latency of read and write jobs, and improve efficiency of the system. In some examples, the resources may be time resources, and the I/O schedulers may access a global clock within the DMS to perform the synchronization.

Figure 1:
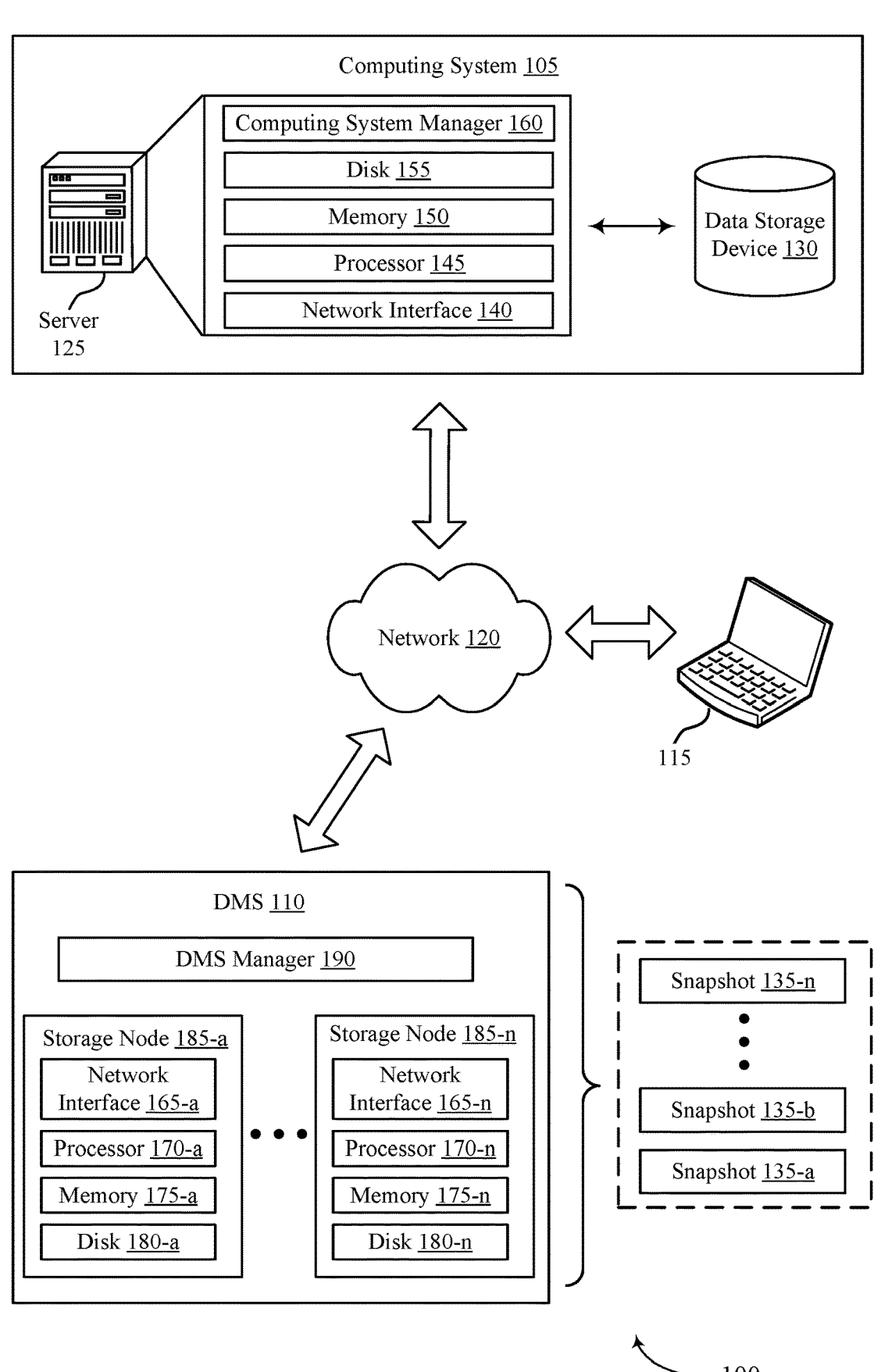
FIG. 1 illustrates an example of a computing environment that supports time synchronization across independent input/output (I/O) schedulers in accordance with aspects of the present disclosure.

FIG. 1 illustrates an example of a computing environment 100 that supports time synchronization across independent I/O schedulers in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS)

or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110 may manage backup and recovery of data stored in a distributed file system (e.g., an SDFS) across multiple disks 180 of the DMS 110. For example, the DMS 110 may include multiple nodes or clusters each including one or more disks 180 (e.g., in some examples, each storage node 185 may include one or more disks 180). Each disk 180 may include or be coupled with a corresponding I/O scheduler that schedules ordering and timing of submissions of I/Os between several jobs and the disk 180. The DMS 110 may define priorities for jobs, where higher priority jobs may be referred to as interactive jobs and lower priority jobs may be referred to as non-interactive jobs. An I/O scheduler for a given disk 180 may schedule interactive I/O requests unconditionally, and may conditionally schedule non-interactive I/O requests based on an availability of computing resources of the disk (also referred to as tokens). The I/O scheduler for each disk 180 in the system may deposit new resources periodically. At each disk 180, execution of non-interactive I/O requests may be throttled to prioritize higher priority I/O jobs until new resources are deposited. As read or write jobs may occur across disks 180, throttling at one disk 180 may cause delay and/or idle time at other disks 180.

The DMS 110 of resource deposition across multiple I/O schedulers that are associated with disks 180 performing a same interactive job. That is, if the DMS 110 receives a request to perform an interactive job, and the interactive job involves a read or a write to multiple disks 180 of the DMS 110, the DMS 110 may indicate, to the I/O schedulers of the disks 180, to synchronize resource deposition at least during execution of the interactive job. By synchronizing resource deposition, the I/O schedulers may deposit additional resources at or around the same time (e.g., according to a same deposition periodicity, which may be aligned or synchronized in time). As such, each of the I/O schedulers may deposit additional resources and perform one or more non-interactive jobs based on the resource deposition within a same time period, which may pause execution of the interactive job at each of the disks 180 during the time period.

The different disks may perform the interactive job, including one or more read or write operations, consecutively, such that the synchronized deposition of resources across disks 180 may reduce a likelihood that one or more disks are idle while another disk completes a non-interactive job, as the synchronized deposition of resources increases the likelihood that the I/O schedulers will synchronize completion of non-interactive jobs. Reduced disk idle time may reduce latency of read and write jobs, and improve efficiency of the system. In some examples, the resources may be time resources, and the I/O schedulers may access a global clock within the DMS 110 to perform the synchronization.

Figure 2:
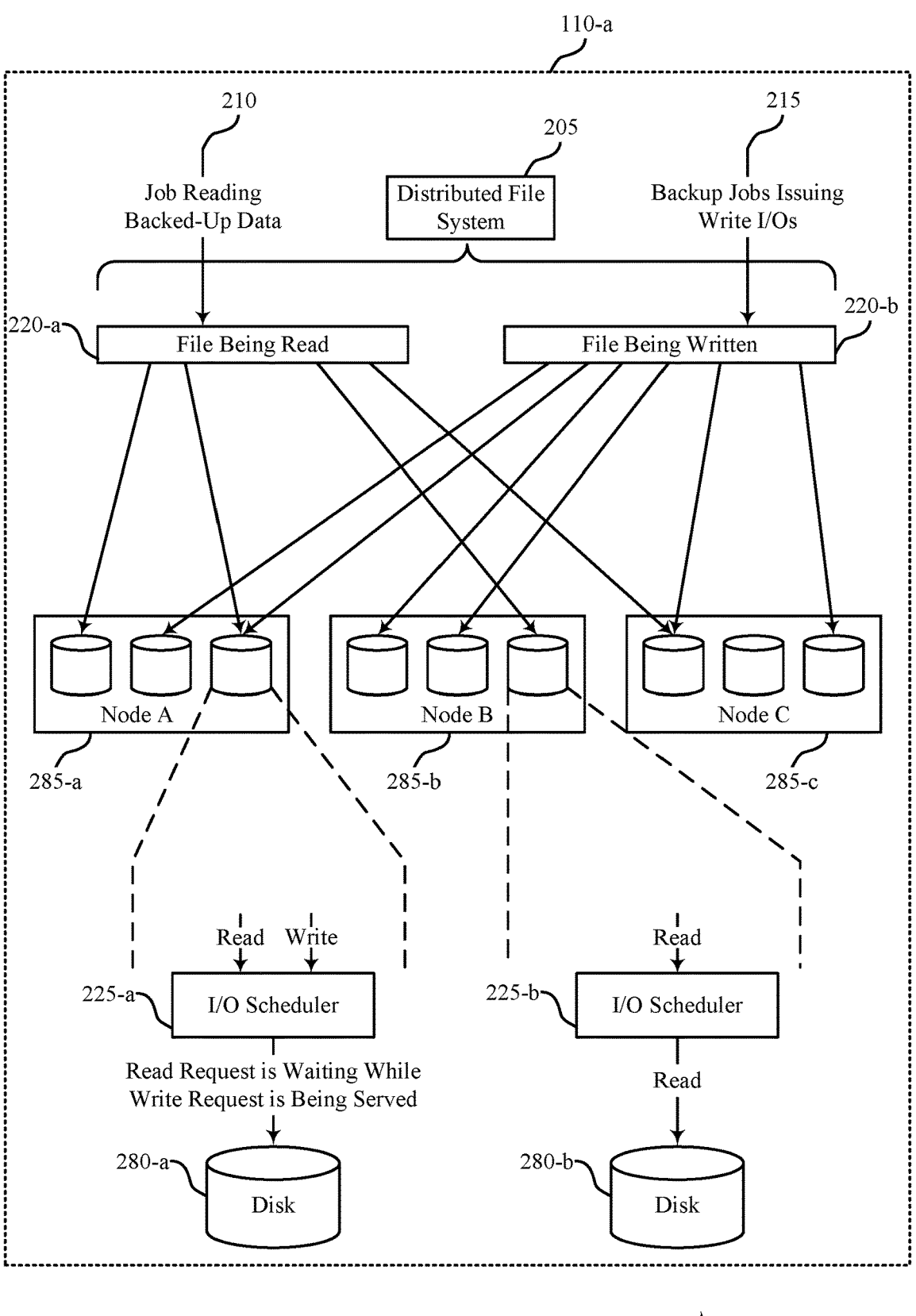
FIG. 2 shows an example of a file system storage architecture that supports time synchronization across independent I/O schedulers in accordance with aspects of the present disclosure.

FIG. 2 shows an example of a file system storage architecture 200 that supports time synchronization across independent I/O schedulers in accordance with aspects of the present disclosure. The file system storage architecture 200 may implement or be implemented by aspects of the computing environment 100 described with reference to FIG. 1. For example, the file system storage architecture 200 illustrates a distributed file system 205 that may be used across multiple nodes 285 (e.g., nodes 285-*a*, 285-*b*, and 285-*c*), which may represent examples of a storage node 185 or some other node of a DMS 110 (e.g., cloud data management (CDM) nodes, or some other type of node), as described with reference to FIG. 1. Each node 285 in the file system storage architecture 200 may include one or more disks 280 and corresponding I/O schedulers 225. The disks 280 (e.g., storage volumes where data of the distributed file system 205 is stored) may represent examples of a disk 180, as described with reference to FIG. 1.

The distributed file system 205 (e.g., an SDFS, such as a Google File system (GFS), or other type of distributed file system 205) may be a relatively fault-tolerant system distributed across one or more clusters or nodes 285 (e.g., or some other distributed storage). The distributed file system 205 may include multiple files 220, which may include encoded data. In some examples, the data within the distributed file system 205 may be organized into stripes and chunks and encoded (e.g., using Reed-Solomon encoding or some other type of encoding) to include data chunks and code chunks, as described in further detail elsewhere herein, including with reference to FIG. 3. The distributed file system may be managed by a DMS 110-*a* which may be an example of a DMS 110 as described with reference to FIG. 1. For example, the DMS 110-*a* may include the multiple nodes 285 and the one or more disks 280.

The DMS 110-*a* may receive requests to perform jobs for the distributed file system 205. A job may include one or more I/O operations, such as write operations or read operations. If there are several jobs being performed by the DMS 110-*a*, each job may independently issue read or write I/O requests to the distributed file system 205. The read or write I/O requests may be routed to various disks 280 within the DMS 110-*a*. In the example of FIG. 2, the DMS 110-*a* may perform a first job 210 that is associated with reading backed-up data. The first job 210 may be associated with reading backed-up data stored in a file 220-*a* (and one or more other files 220, in some examples). The DMS 110-*a* may perform a second job 215 that is associated with writing data to the distributed file system 205. The second job 215 may write data to at least a second file 220-*b* of the distributed file system 205 (e.g., and one or more other files 220, in some examples).

The first job 210 reading backed-up data may issue at least four I/O read requests to various disks 280 in the DMS 110-*a*. In this example, the first job 210 may issue I/O read requests to two disks 280 in the node 285-*a*, one disk 280 in the node 285-*b*, and one disk 280 in the node 285-*c*, as shown by the arrows pointing from the file 220-*a* to the various disks 280. The second job 215 writing data to the distributed file system 205 may issue at least six I/O write requests to various disks 280. For example, the second job 215 may issue I/O write requests to two disks 280 in the node 285-*a*, two disks 280 in the node 285-*b*, and two disks 280 in the node 285-*c*, as shown by the arrows pointing from the file 220-*b* to the various disks 280.

Each disk 280 may be associated with (e.g., may include or be coupled with) a respective I/O scheduler 225. The I/O scheduler 225 may schedule I/Os from one or more jobs in a meaningful and relatively efficient manner. Each I/O scheduler 225 may be independent (e.g., may make each decision independently from other I/O schedulers 225) and may not know what other I/O schedulers 225 for other disks 280 are doing. For example, the decisions made by the I/O scheduler 225-*a* for the disk 280-*a* may be independent from decisions made by the I/O scheduler 225-*b* for the disk 280-*b*.

In the example of FIG. 2, the I/O scheduler 225-*b* may receive a single I/O request, which may be a read I/O request issued by the first job 210. The I/O scheduler 225-*b* may schedule the disk 280-*b* to serve the read I/O request at the time that the request is received based on the I/O scheduler 225-*b* only receiving a single I/O request. The I/O scheduler 225-*a* may receive two I/Os simultaneously or in at least partially overlapping time periods. A first I/O may be a read I/O associated with or issued by the first job 210 and a second I/O may be a write I/O associated with or issued by the second job 215. In this example, the I/O scheduler 225-*a* may schedule the disk 280-*a* to serve the write request first, and the read request may wait while the write request is being served. The I/O scheduler 225-*a* may schedule the disk 280-*a* to serve the read request after the write request is complete (e.g., after the corresponding data has been written to the disk 280-*a*).

In some examples, it may be beneficial to prioritize I/Os for one or more jobs over I/O for other jobs. As such, each I/O scheduler 225 may support an interactive mode behavior, where the I/O scheduler 225 may throttle or rate-limit I/O from relatively low priority jobs, which may be referred to as non-interactive jobs, in the presence of higher priority jobs, which may be referred to as interactive jobs. The interactive jobs may be jobs associated with a priority greater than or equal to a threshold priority, and the non-interactive jobs may be jobs associated with a priority less than the threshold priority, in some examples. The DMS may define the priorities for different types of jobs, may define the threshold priority, or both. As an example, a DMS 110-*a* may restore a backup snapshot in case of a disaster scenario, which may include reading snapshotted data as fast as possible to achieve a relatively low recovery time objective (RTO). The snapshot restoration job may be associated with a relatively high priority. The DMS 110-*a* may still be able to back up other data at a reasonable rate and maintain compliance with a service level agreement (SLA) by prioritizing the restoration operation and throttling other back up operations that may be associated with lower priorities. Techniques for throttling relatively low priority operations are described in further detail elsewhere herein, including with reference to FIG. 4.

Each I/O scheduler 225 may thereby independently (e.g., without synchronizing with other I/O schedulers 225) determine when and how to throttle relatively low priority I/Os. In some examples, as described with reference to FIG. 4, the I/O scheduler 225 may periodically deposit resources and may perform non-interactive operations when resources are available. However, different I/O schedulers 225 may not deposit resources at a same time or within the same time intervals. As such, if an interactive job is ongoing across multiple disks 280, the disks 280 may each pause at different times to perform non-interactive jobs. Because reads and writes to multiple disks 280 may be done sequentially, as described in further detail with reference to FIG. 3 and FIG. 5, such non-synchronized pauses may increase latency and reduce throughput and I/O contention at the DMS 110-*a*.

Techniques, systems, and devices described herein provide for synchronization across multiple I/O schedulers 225 for disks 280 that are associated with (e.g., executing) a same interactive operation. For example, if the second job 215 is an interactive or relatively high priority write job that indicates one or more write I/Os to multiple disks 280, including the disks 280-*a* and 280-*b* illustrated in FIG. 2, then the I/O schedulers 225-*a* and 225-*b* as described herein may synchronize resource deposition with each other and/or other I/O schedulers 225 for other disks 280 to which the second job 215 writes data. By synchronizing resource deposition, the I/O schedulers 225 may align timing for execution of non-interactive or relatively lower priority operations, which may reduce latency and improve performance of the system when executing the second job 215 and the other lower priority jobs. The resource deposition synchronization techniques are described in further detail elsewhere herein, including with reference to FIGS. 3-7.

Figure 3:
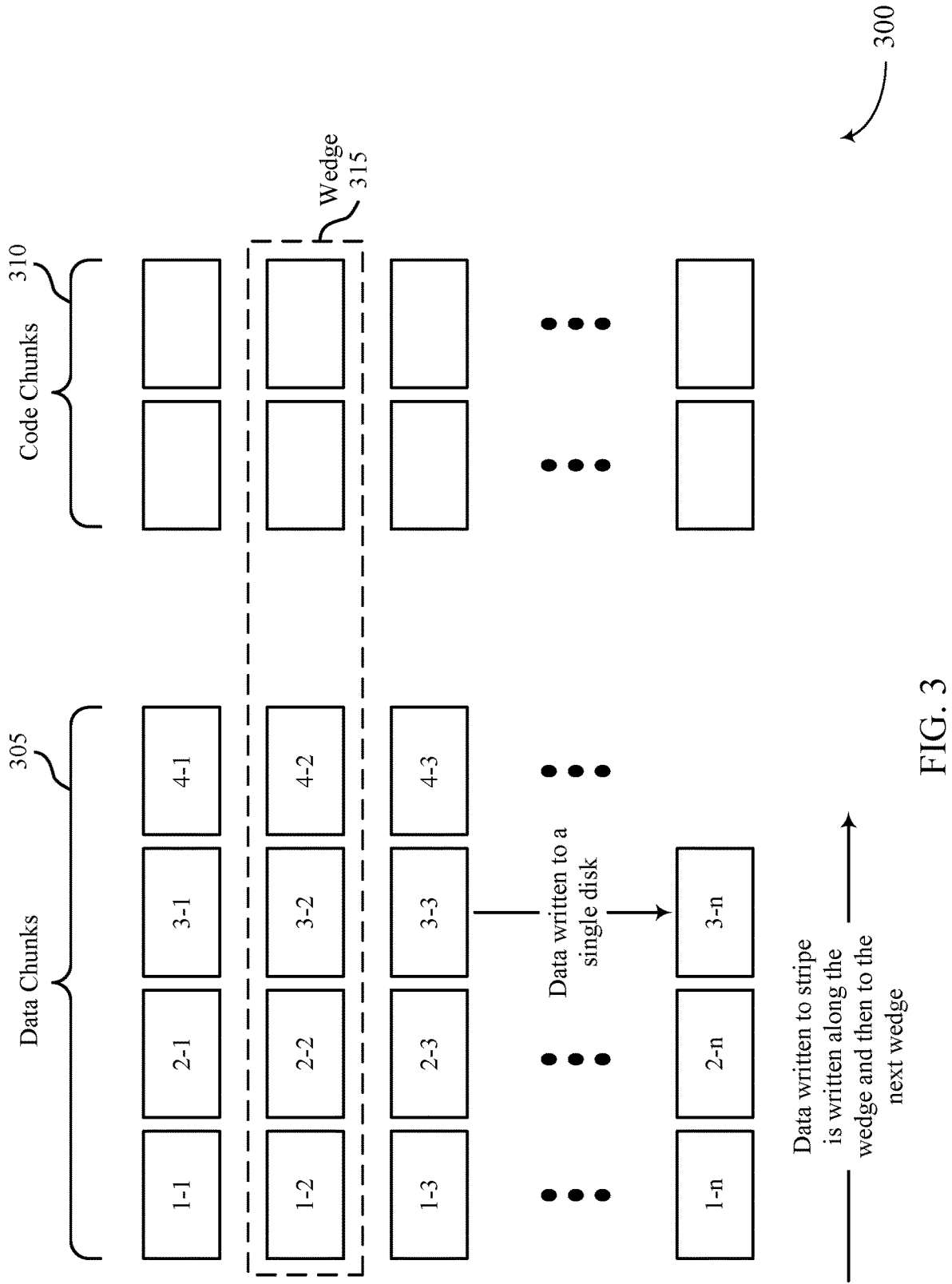
FIG. 3 shows an example of an encoded data stripe that supports time synchronization across independent I/O schedulers in accordance with aspects of the present disclosure.

FIG. 3 shows an example of an encoded data stripe 300 that supports time synchronization across independent I/O schedulers in accordance with aspects of the present disclosure. The encoded data stripe 300 may implement or may be implemented by aspects of the computing environment 100, the file system storage architecture 200, or both. For example, the encoded data stripe 300 illustrates a structure for storing a stripe of data of a distributed file system across multiple disks, where the distributed file system and the disks may represent examples of corresponding devices and components as described with reference to FIGS. 1 and 2.

The distributed file system may be deployed and work on top of multiple disks to store persistent data for later use. The distributed file system may divide relatively large pieces of data into several smaller pieces, which may be allocated to multiple disks in an interleaved fashion to provide for parallelization across disks. For example, data in the distributed file system may be organized by one or more stripes, such as the data stripe 300. A stripe may be a relatively large contiguous segment of a file in the distributed file system and may be a building block of data in the file system. The data stripe 300 may be divided into multiple chunks, which may be stored across multiple different disks. Such division may be done to utilize multiple disks in parallel to improve performance and fault tolerance, among other examples.

In this example, the distributed file system may use Reed-Solomon encoding. That is, the data may be formatted using Erasure coding and may include some fault tolerance. For example, the Reed-Solomon encoding may be a 4:2 encoding structure, with data stored in four data chunks 305 and two redundant code chunks 310 to provide failure tolerance of losing up to two chunks. Although a 4:2 Reed-Solomon encoding scheme is illustrated in FIG. 3, it is to be understood that data in a distributed file system as described herein may be stored in accordance with one or more different encoding structures, including those illustrated and other structures not illustrated in FIG. 3.

The data stripe 300 may be divided into multiple wedges 315, where a first wedge may include data chunks 1-1, 2-1, 3-1, and 4-1, as well as two redundant code chunks 310. A second wedge 315 may include data chunks 1-2, 2-2, 3-2, and 4-2, as well as two redundant code chunks 310, and so on. Reading or writing a file from or to the distributed file system may include reading or writing relatively small pieces of data from or to multiple disks in tandem. For example, data may be written and read to one or more disks sequentially across the wedges 315. That is, data written to the data stripe 300 may be written along a first wedge 315 and then to a second wedge 315, and so on. For example, the data may be written in the order of 1-1, 2-1, 3-1, and 4-1 (of the first wedge 315), followed by 1-2, 2-2, 3-2, and 4-2 (of the second wedge 315), through 1-n, 2-n, 3-n, and 4-n (of an $n^{th}$ wedge 315). The code chunks 310 may exist to provide redundancy for the purposes of fault tolerance, and may thereby be ignored. Each data chunk 305 in a wedge 315 may be written to a respective disk. As such, each of the data chunks 1-1, 1-2, 1-3, . . . , 1-n may be written to a single disk, and each of the data chunks 2-1, 2-2, 2-3, . . . , 2-n may be written to a single disk, and so on. In this example, there may be four disks that serve the I/O for a given job.

By writing data in the manner described herein, the DMS may write data to each disk of a set of disks associated with a job sequentially across wedges 315, which may improve efficiency and reduce processing as compared with writing a relatively large portion of data to each disk in order. However, in some cases, scheduling decisions by I/O schedulers for one or more of the four disks associated with a write or read operation may make scheduling decisions independently of one another. In such cases, the disks may perform relatively low priority operations at different times, which may interrupt the sequential execution of the operation in the form of one or more relatively long wait periods, where some of the disks may be idle (e.g., not performing any operations).

As described herein, I/O schedulers for different disks that are performing a same read or write operation may coordinate with one another to improve alignment of execution of lower priority operations and reduce overall system latency, as described in further detail with reference to FIGS. 4-7.

Figure 4:
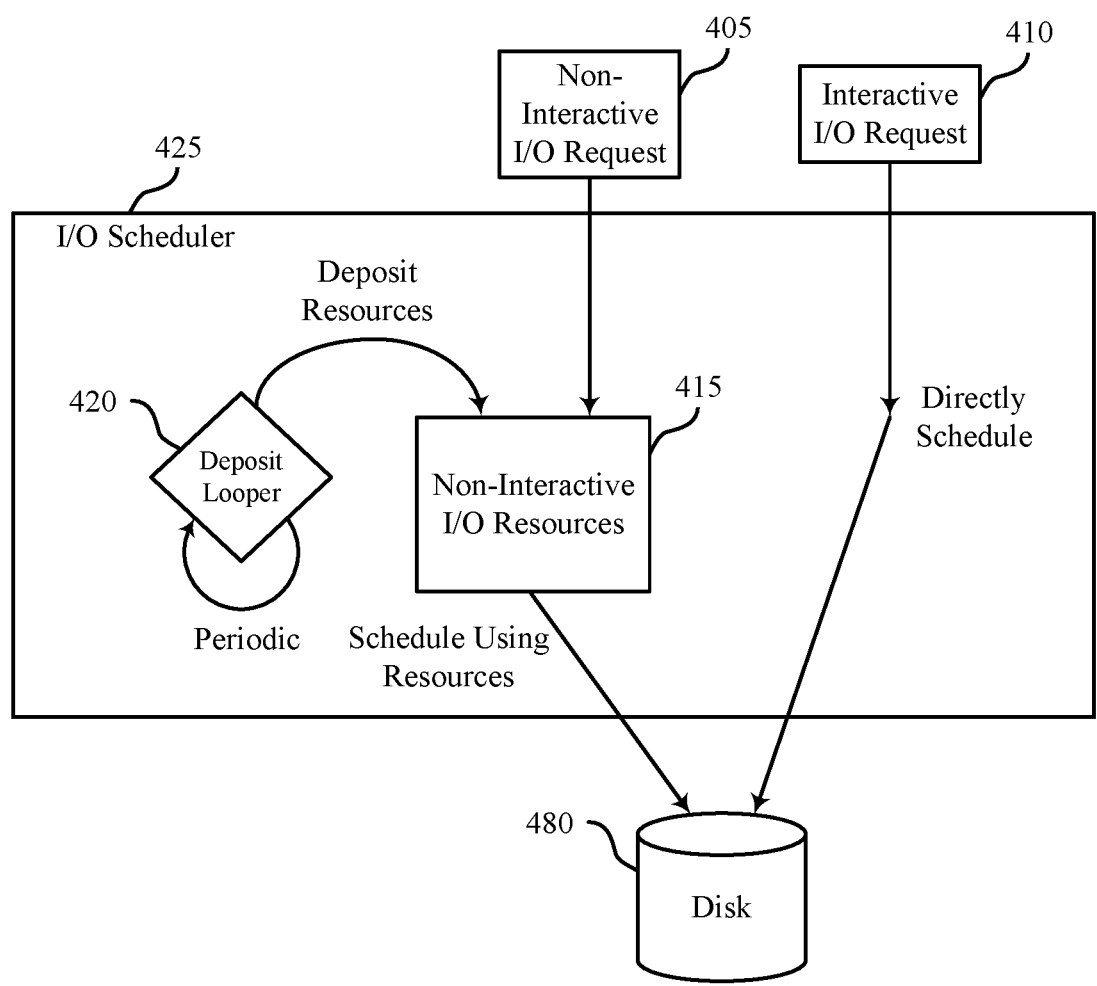
FIG. 4 shows an example of an I/O scheduling configuration that supports time synchronization across independent I/O schedulers in accordance with aspects of the present disclosure.

FIG. 4 shows an example of an I/O scheduling configuration 400 that supports time synchronization across independent I/O schedulers in accordance with aspects of the present disclosure. The I/O scheduling configuration 400 may implement or be implemented by aspects of the computing environment 100, the file system storage architecture 200, and the encoded data stripe 300. For example, the I/O scheduling configuration 400 illustrates an I/O scheduler 425 that schedules I/O for a disk 480, which may represent examples of I/O schedulers and disks as described with reference to FIGS. 1-3.

In this example, the I/O scheduler 425 may operate in an interactive mode. That is, the I/O scheduler 425 may prioritize interactive I/O requests 410 over non-interactive I/O requests 405. As described with reference to FIG. 2, an interactive I/O request 410 may correspond to an I/O request of a job or operation that is associated with a relatively high priority (e.g., a priority above a threshold), and a non-interactive I/O request 405 may correspond to an I/O request of a job or operation that is associated with a relatively low priority (e.g., a priority below a threshold). In this mode, the I/O scheduler 425 may serve interactive I/O requests 410 unconditionally and may throttle or rate-limit other non-interactive I/O requests 405 to leave enough disk bandwidth (e.g., time) for interactive I/Os.

The rate-limiting of non-interactive I/O requests 405 may be done using deposition of non-interactive I/O resources 415, which may be referred to as tokens or rate-limiters, in some examples. A quantity of resources 415 or tokens that are available in the I/O scheduler 425 at a given time may serve as a representation of computing resources or processing resources that are available for serving non-interactive I/O requests 405 at that time. By depositing non-interactive I/O resources 415 periodically, the I/O scheduler 425 may ensure that non-interactive I/O requests 405 are throttled at least to the resource deposition periodicity. In some examples, the non-interactive I/O requests 405 may be rate-limited such that there is at most times a quantity of non-interactive I/O requests 405 waiting for availability of more non-interactive I/O resources 415 to be served.

The amount of non-interactive I/O resources 415 to deposit within a deposition periodicity may be determined by the DMS, the I/O scheduler 425, or both, based on a quantity of previously performed I/Os. For example, the DMS may calculate an average quantity of interactive I/O operations that are performed per second or some other time period over the past few time periods. The DMS may determine a quantity of non-interactive resources 415 or tokens that may be consumed within a given deposit time period, which may correspond to the resource deposition periodicity (e.g., a one second time period, or some other time period). The resource deposition periodicity may be configured or defined across multiple I/O schedulers 425 (e.g., across all disks within a same node or cluster). The I/O scheduler 425 may thereby determine a quantity of non-interactive I/O resources 415 to deposit at a given time based on measurements of previous I/Os.

In some examples, the amount or quantity of non-interactive I/O resources 415 for deposition within a given deposition time period may be determined in accordance with Equation 1.

$$\text{NI\_TOKENS} = \max(\text{MIN\_NI\_TOKENS}, \text{MAX\_NI\_TOKENS} - \text{THROTTLE\_FACTOR} * \text{AVG\_INTERACTIVE\_IOPS}) \quad (1)$$

In Equation 1, NI_TOKENS may represent a quantity of non-interactive I/O resources 415 (e.g., tokens) to be deposited or which can be consumed per second. MIN_NI_TOKENS may represent a minimum quantity of non-interactive I/O resources 415 which can be consumed per second. This value may be set or configured by the DMS, in some examples. AVG_INTERACTIVE_IOPS may represent an average quantity of recent interactive I/Os per second (IOPS). THROTTLE_FACTOR may be a parameter that may be set by the I/O scheduler 425, the DMS, or some other component, to determine how aggressively the non-interactive I/O requests 405 may be throttled.

The I/O scheduler 425 may include a deposit looper 420, or some other component (e.g., a software or hardware component) that is operable to control the resource deposition. The deposit looper 420 may deposit the determined quantity of non-interactive I/O resources 415 periodically in accordance with the resource deposition periodicity. Any non-interactive I/O requests 405 that are received at the I/O scheduler 425 may be stored in a buffer or queue until a subsequent deposit of more non-interactive I/O resources 415. The I/O scheduler 425 may issue the non-interactive I/O request 405 to the disk 480 for execution once sufficient resources 415 are available. The I/O scheduler 425 may consume the corresponding resources 415 based on issuing the non-interactive I/O request 405 to the disk 480.

In some examples, a read or write job may be issued to multiple disks 480. For example, a job may instruct the DMS to write or read data to two or more disks 480, where the writing and reading of the data may be done sequentially across the disks 480, as described with reference to FIG. 3. In such cases, sequential I/O requests for the writes and reads may be transmitted to multiple I/O schedulers 425. However, the I/O schedulers 425 for different disks 480 may operate independently from one another. That is, a first I/O scheduler 425 may not interact with (e.g., communicate with or receive feedback from) a second I/O scheduler 425. As such, the timing of resource deposition may be different at the different I/O schedulers 425.

Techniques described herein provide for a DMS to synchronize resource deposition across multiple disks 480 and associated I/O schedulers 425 when data is being written or read across the disks 480 as part of a same job. By synchronizing the resource deposition, the multiple I/O schedulers may issue non-interactive I/O requests 405 to the disks 480 simultaneously or within a similar time period. Letting non-interactive data traffic go through in a same time period across all nodes and/or disks 480 within a same cluster may result in pauses for interactive operations that are overlapping in nature and occur once per deposition period (e.g., one second or some other time period). Thus, besides the single pause per period, there may not be other interruptions for the interactive traffic. Such techniques are illustrated and described in further detail elsewhere herein, including with reference to FIG. 6.

In some examples, synchronization of resource deposition across I/O schedulers 425 may be done using a global clock of the DMS (e.g., Kronos, or some other global system clock). Each I/O scheduler 425 may periodically synchronize an internal clock or time at the I/O scheduler 425 with the global clock. For example, the I/O schedulers 425 may align a starting point of a resource deposition periodicity with a start of a second or some other unit of time on the global clock. As such, the I/O schedulers 425 may deposit non-interactive I/O resources 415 within certain time epochs. A precision of such synchronization using the global clock may be relatively high (e.g., a precision of one millisecond, or some other value), and may provide for the I/O schedulers to coordinate on resource deposition while maintaining independence for other decisions by the I/O schedulers.

In some examples, if there are enough non-interactive I/O requests 405 contending with interactive I/O requests 410, the I/O rate or throughput may increase. For example, the non-interactive I/O rate may increase, and the interactive I/O rate may increase, remain the same, or decrease by an amount that is less than an amount by which the interactive I/O rate may decrease if resource deposition is not synchronized. As such, if Equation 1 is used to determine a quantity of non-interactive I/O resources 415 to deposit per deposition period and resource deposition is synchronized across multiple I/O schedulers 425, a value of MIN_NI_TOKENS may be increased as compared with scenarios in which the I/O schedulers 425 do not synchronize resource deposition (e.g., from 20 to 40 resources per deposition period, or some other quantities).

Figure 5:
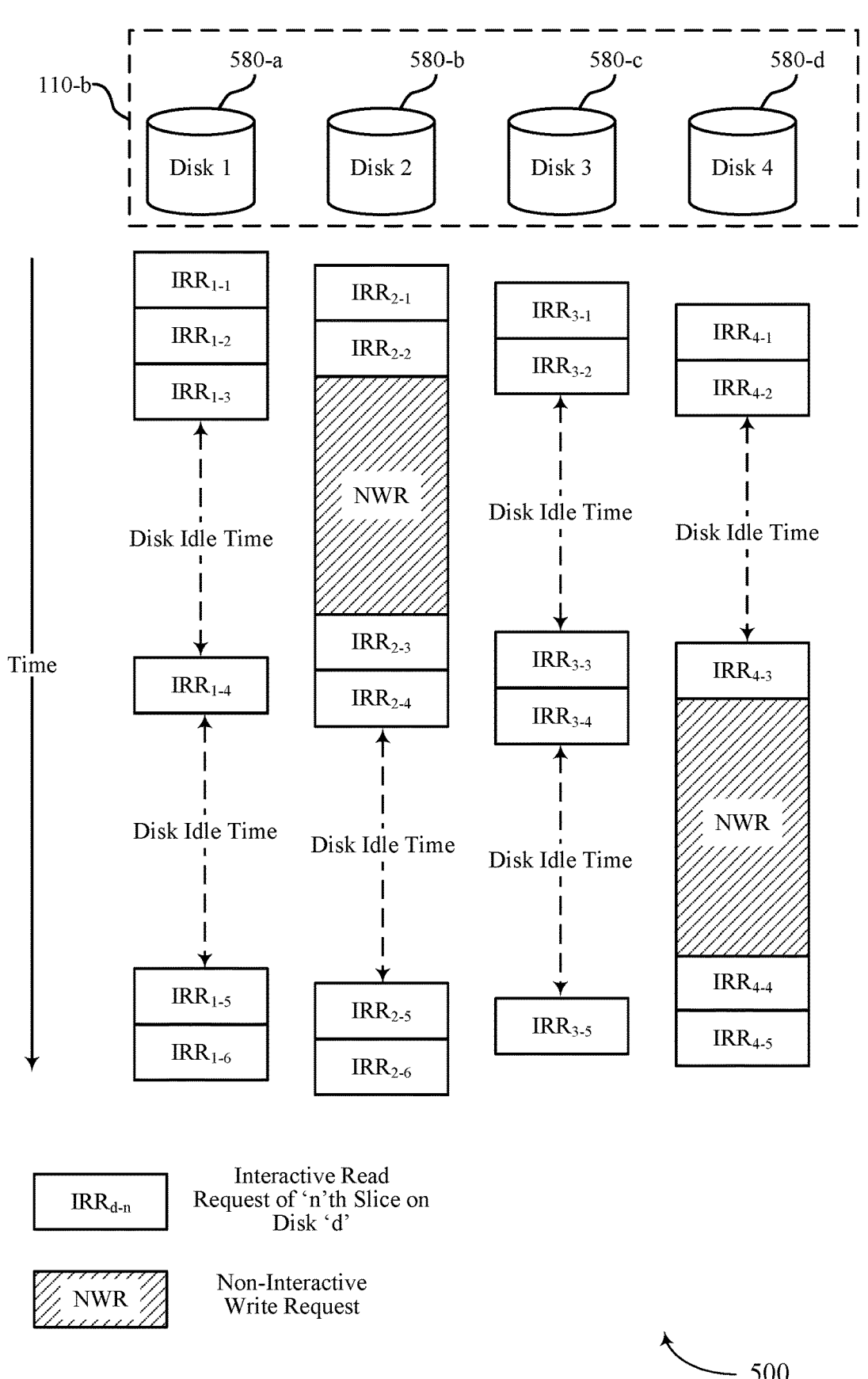
FIG. 5 shows an example of a job execution timeline that supports time synchronization across independent I/O schedulers in accordance with aspects of the present disclosure.

FIG. 5 shows an example of a job execution timeline 500 that supports time synchronization across independent I/O schedulers in accordance with aspects of the present disclosure. The job execution timeline 500 may implement or be implemented by aspects of the computing environment 100, the file system storage architecture 200, the encoded data stripe 300, and the I/O scheduling configuration 400. For example, the job execution timeline 500 illustrates an example timeline for execution, by multiple disks 580 (e.g., disks 580-a, 580-b, 580-c, and 580-d) and corresponding I/O schedulers, of an interactive read job ongoing in conjunction with one or more other non-interactive write operations when I/O schedulers for the multiple disks 580 are not synchronized with each other. The disks 580) may represent examples of the disks described with reference to FIGS. 1-4. The interactive and non-interactive jobs may be associated with a distributed file system that is managed by a DMS 110-b, which may be an example of a DMS 110 as described with reference to FIGS. 1-4. For example, the DMS 110-b may include the disks 580 and the corresponding I/O schedulers.

The DMS 110-b may receive a request to perform a job for a distributed file system. The job may be an interactive job (e.g., a relatively high priority job) associated with multiple disks 580 of the distributed file system. In this example, the job may be a read job associated with reading data from the disks 580-a, 580-b, 580-c, and 580-d of a distributed file system. A job as described herein may issue multiple I/O operations to the underlying DMS 110-b, and the DMS 110-b may forward such operations to different I/O schedulers and disks 580. To perform the interactive read job illustrated in FIG. 5, the DMS 110-b may issue read operations to the I/O schedulers for the disks 580-a, 580-b, 580-c, and 580-d.

The read operations may be executed by or served by the disks 580 at certain times when scheduled by the I/O scheduler. FIG. 5 illustrates a timeline for executing multiple interactive read requests that are part of the same read job, while other non-interactive jobs are also ongoing and issuing non-interactive write requests to the disks 580. In this example, the interactive read request may be labeled as $IRR_{d-n}$, where n may represent the slice of data to be read, and d may represent the disk 580 from which the data is to be read. The data may be stored across the disks 580 in slices and wedges, as described in further detail elsewhere herein, including with reference to FIG. 3.

As described with reference to FIG. 3, the interactive read job performed across multiple disks 580 may be performed sequentially. For example, the disk 580-a may start to execute a first interactive read request $IRR_{1-1}$ to read a first slice of data before the disk 580-b starts to execute a second interactive read request $IRR_{2-1}$ to read a second chunk of the first slice of data, and so on until the disk 580-d starts to execute the interactive read request $IRR_{4-1}$ to read a fourth chunk of the first slice of data. After the fourth chunk of the first slice of data is read, the disks 580 may be finished reading first slice of the requested data, and the sequential read operations may return to disk 580-a for reading a first chunk of a second slice as part of $IRR_{1-2}$, and so on. The disks 580 may finish or complete serving the read job after reading a final chunk of a final slice of the requested data. In this example, the disk 580-b may complete the read job by executing the $IRR_{2-6}$ to read a second chunk of the sixth slice of data.

In some examples, each disk 580 may wait until another disk 580 has completed an interactive read request before serving a subsequent interactive read request. In some other examples, as illustrated in FIG. 5, consecutive interactive read requests may be served by different disks 580 in at least partially overlapping time periods. For example, the disk 580-a may start serving the $IRR_{1-1}$ at a first time and complete the $IRR_{1-1}$ at a third time. The disk 580-b may start serving the next consecutive $IRR_{2-1}$ at a second time that is between the first and third times (e.g., while the $IRR_{1-1}$ is still pending at the disk 580-a). Such partial parallelism between disks 580 may reduce latency.

The non-interactive write requests may be issued to one or more of the disks 580 at various times based on a resource deposition periodicity of an I/O scheduler for the disk 580. In this example, the resource deposition periodicities of the different disks 580-a through 580-d may not be aligned in time. For example, the I/O scheduler for the disk 580-b may deposit additional non-interactive I/O resources in accordance with a resource deposition periodicity at a first time that may occur while the disk 580-b is executing the $IRR_{2-2}$. Due to the availability of resources, the I/O scheduler may issue a non-interactive operation, such as a non-interactive write request (NWR), to the disk 580-b. The disk 580-b may thereby perform the NWR after completing execution of the $IRR_{2-2}$. The execution of the NWR may pause execution of the interactive operations by the disk 580-b, such that the disk 580-*b* may not perform a subsequent IRR, which may be the IRR$_{2-3}$, until after the NWR is complete.

The other disks 580-*a*, 580-*c*, and 580-*d* and their respective I/O schedulers may perform operations independently of each other and the disk 580-*b*, such that the NWR performed by the disk 580-*b* may not impact scheduling decisions by the other I/O schedulers. The disks 580-*c*, 580-*d*, and 580-*a* may continue to consecutively or sequentially perform the IRR$_{3-2}$, the IRR$_{4-2}$, and the IRR$_{1-3}$ after the disk 580-*b* starts execution of the IRR$_{2-2}$, and irrespective of the NWR at the disk 580-*b*. However, after the IRR$_{1-3}$, the next consecutive read operation to be performed as part of the interactive job may be the IRR$_{2-3}$ by the disk 580-*b*. Thus, because the interactive read job is performed sequentially and the disk 580-*b* is paused during the duration of the NWR, the other disks 580 may also wait to complete execution of the interactive job until the disk 580-*b* performs the NWR and starts to perform the IRR$_{2-3}$. The other disks 580 may not, however, have available resources during this time, which may result in disk idle times at the other disks 580 during which the disks 580) may not perform any operations. For example, resource deposition periodicities for the other disks 580 may be misaligned such that new resources are not deposited until after the NWR operation is done being performed by the disk 580-*b*, and the disks 580 may be unable to perform other operations during that time due to the absence of resources, which may increase latency and reduce efficiency and throughput.

In some examples, such pauses in the execution of the interactive read job may occur multiple times at one or more different disks 580 while the read job is being executed. For example, after the NWR is complete at the disk 580-*b*, the disk 580-*b* may continue the interactive read job by performing the IRR$_{2-3}$. The disks 580-*c* and 580-*d* may continue to perform the IRR$_{3-3}$ and the IRR$_{4-3}$ consecutively. However, the I/O scheduler for the disk 580-*d* may deposit resources at a second time while the disk 580-*d* is completing execution of the IRR$_{4-3}$. Thus, the I/O scheduler may issue an NWR to the disk 580-*d* based on the availability of resources, and the disk 580-*d* may perform the NWR accordingly, which may pause execution of other operations, including the interactive read operations, by the disk 580-*d*. The disks 580-*a*, 580-*b*, and 580-*c* may perform the next consecutive operations of the interactive read request, including the IRR$_{1-4}$, the IRR$_{2-4}$, and the IRR$_{3-4}$, respectively. However, the performance of the may be paused until after the NWR is complete and the disk 580-*d* can perform the IRR$_{4-4}$, which may delay the sequential interactive read operation across all disks again and may cause disk idle time at the disks 580-*a*, 580-*b*, and 580-*c*.

As illustrated in the example of FIG. 5, disk utilization may be relatively inefficient due to such pauses in execution of interactive jobs. By waiting for an interactive I/O to complete in order to issue subsequent I/Os to other disks 580 for the same stripe may result in disk idleness for a non-trivial amount of time. In this example, because the disks 580 and corresponding I/O schedulers deposit non-interactive I/O resources independently and potentially asynchronously, time points when non-interactive I/O requests on disks 580 may be fulfilled may increase disk idleness.

Although the interactive job described in the example illustrated in FIG. 5 is a read of the distributed file system and the non-interactive requests are write requests for the distributed file system, it is to be understood that both interactive and non-interactive jobs may include read jobs, write jobs, or both. The interactive and non-interactive status of a job may depend on a relative priority assigned to that job, as described with reference to FIG. 2. Although not illustrated in FIG. 5, in some cases, the interactive job may be a write job, and the interactive write requests may be paused due to one or more non-interactive write operations, one or more non-interactive read operations, or both.

Techniques described herein provide for I/O schedulers for multiple disks 580 that are performing a same interactive job to coordinate time epochs for depositing non-interactive I/O resources. For example, the I/O schedulers may utilize a distributed steady clock, or some other mechanism to coordinate resource deposition periodicities. As such, the pauses for non-interactive I/O operations may be overlapping in time across the disks 580, and a quantity of non-overlapping pauses at different disks 580 may be reduced, which may increase a speed of the interactive job. Techniques for such coordination are illustrated and described in further detail elsewhere herein, including with reference to FIG. 6.

Figure 6:
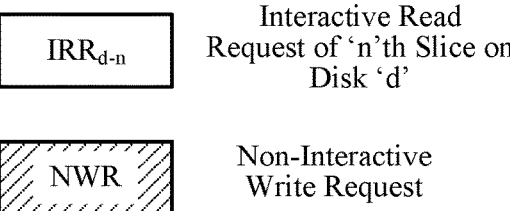
FIG. 6 shows an example of a job execution timeline that supports time synchronization across independent I/O schedulers in accordance with aspects of the present disclosure.
Figure 6:
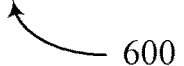

FIG. 6 shows an example of a job execution timeline 600 that supports time synchronization across independent I/O schedulers in accordance with aspects of the present disclosure. The job execution timeline 600 may implement or be implemented by aspects of the computing environment 100, the file system storage architecture 200, the encoded data stripe 300, and the I/O scheduling configuration 400. For example, the job execution timeline 600 illustrates an example timeline for execution, by multiple disks 680 (e.g., disks 680-*a*, 680-*b*, 680-*c*, and 680-*d*) and corresponding I/O schedulers, of an interactive read job ongoing in conjunction with one or more other non-interactive write operations when resource deposition is synchronized or coordinated across I/O schedulers for the multiple disks 680. The disks 80 may represent examples of the disks described with reference to FIGS. 1-5. The interactive and non-interactive jobs may be associated with a distributed file system that is managed by a DMS 110-*c*, which may be an example of a DMS 110 as described with reference to FIGS. 1-4. For example, the DMS 110-*c* may include the disks 680 and the corresponding I/O schedulers.

The DMS 110-*c* may receive a request to perform a job for a distributed file system. The job may be an interactive job (e.g., a relatively high priority job) associated with multiple disks 680 of the distributed file system. In this example, the job may be a read job associated with reading data from disks 680-*a*, 680-*b*, 680-*c*, and 680-*d* of a distributed file system. The read job may represent an example of the interactive read job described with reference to FIG. 5. For example, the read job may issue multiple I/O operations to the underlying DMS 110-*c*, and the DMS 110-*c* may forward such operations to different I/O schedulers and disks 680. In this example, the disks 680-*a*, 680-*b*, 680-*c*, and 680-*d* may receive and sequentially execute the interactive read requests IRR$_{1-1}$ through IRR$_{2-6}$, where an IRR$_{d-n}$ may represent a request to read a slice of data, represented by n, in a disk 680, represented by d, as described with reference to FIG. 5. The I/O schedulers may receive one or more non-interactive read or write requests during execution of the interactive read job being performed.

As described herein, to improve latency and efficiency associated with executing the read operation by multiple disks 680, the I/O schedulers for the multiple disks may coordinate resource deposition. That is, the I/O schedulers may synchronize availabilities of non-interactive I/O resources across the disks 680-*a*, 680-*b*, 680-*c*, and 680-*d* based on the disks executing the interactive job associated with a higher priority than priorities of other non-interactive jobs. As described with reference to FIGS. 2 and 3, synchronizing the resource deposition across disks 680 may include the I/O schedulers using a global clock of the distributed file system and/or the DMS 110-*c* to align time epochs during which non-interactive I/O resources are deposited at the I/O schedulers (e.g., deposition periods). For example, the I/O schedulers may synchronize a deposition time with the start of a second or some other unit of time on the global system clock. A quantity of resources deposited per deposition period and a resource deposition periodicity across the I/O schedulers may be the same based on parameters defined by the DMS 110-*c* or by a cluster or node that includes the I/O schedulers (e.g., a pre-configured periodicity).

The I/O schedulers may perform the synchronization after receiving a request to perform the same interactive job. In some examples, if an I/O scheduler has already started a resource deposition period, the I/O scheduler may perform the synchronization after the resource deposition period is complete and before a next resource deposition period. In some examples, the DMS 110-*c* may send a signal or indication that requests the I/O schedulers to synchronize. Additionally, or alternatively, the I/O schedulers may autonomously synchronize based on the interactive write requests or based on a configuration of the schedulers within a cluster of the DMS 110-*c*, or both.

In the example of FIG. 6, the DMS 110-*c* may issue or send multiple I/O operations, including the $IRR_{1-1}$ through the $IRR_{2-6}$, for an interactive read job to the I/O schedulers associated with the disks 680-*a*, 680-*b*, 680-*c*, and 680-*d*. The disks 680 may perform the operations during a time period 605. The DMS 110-*c* may additionally instruct the I/O schedulers to synchronize respective availabilities of non-interactive I/O resources between each other, at least during the time period 605 in which the job is being executed. In some examples, the DMS 110-*c* may instruct all disks 680 and corresponding I/O schedulers that are executing a same interactive job to synchronize. Additionally, or alternatively, the DMS 110-*c* may instruct all disks 680 and corresponding I/O schedulers within a same node or a same cluster or some other group to synchronize based on the grouping of the disks 680. Based on the synchronization request, the I/O schedulers may utilize a global clock to align time epochs during which non-interactive I/O resources are deposited. The I/O schedulers may perform the synchronizing independently from each other using the global clock. For example, the I/O schedulers may or may not exchange feedback or other information to assist with the synchronization.

The I/O schedulers may subsequently issue the interactive read requests to the disks 680. For example, the disks 680-*a* through 680-*d* may sequentially perform the $IRR_{1-1}$ through the $IRR_{4-1}$. The synchronization across I/O schedulers may be aligned such that the I/O schedulers each deposit additional resources during a time epoch or deposition period that begins at or around a same deposition time. In this example, deposition time may occur during execution of one or more interactive operations, including the $IRR_{3-2}$, the $IRR_{4-2}$, and the $IRR_{1-3}$, as shown by the dashed line in FIG. 6.

The disks 680 may each have available non-interactive I/O resources around the same time based on the synchronization. Thus, the I/O schedulers may issue one or more non-interactive operations, such as the NWRs, to the disks 680 at around the same time in accordance with the resource availabilities. For example, after each disk 680 completes an interactive operation that was pending when the resources were deposited, the disk 680 may subsequently perform the NWR. Thus, the NWRs at each of the disks 680-*a* through 680-*d* may begin at or near the deposition time. The I/O schedulers may thereby support a decentralized method for making a coordinated decision while still maintaining the ability to make other independent scheduling decisions individually.

After the disks 680 complete the non-interactive operations, the disks 680 may resume the interactive read job. For example, the disk 680-*b* may start to execute the $IRR_{2-3}$ after the disk 680-*b* completes the NWR, and the other disks 680 may similarly execute the next sequential interactive read requests until the interactive read job is complete.

By synchronizing resource deposition across disks 680 that are executing a same interactive job as described herein, the job may be completed faster and more efficiently (e.g., using disk space and processing resources more efficiently) than if the resource deposition is not synchronized (e.g., as illustrated in FIG. 5). By letting non-interactive traffic, such as the NWRs illustrated in FIG. 6, go through the disks 680 simultaneously or in at least partially overlapping time periods, pauses in interactive reads may be overlapping in nature. Additionally, or alternatively, such pauses may occur once per deposition period, which means besides one pause, there may not be other interruption for interactive traffic per deposition period, which may increase throughput for interactive jobs. In some examples, by synchronizing the resource deposition, a minimum quantity of resources deposited per period (e.g., MIN_NI_TOKENS) may be increased, because an I/O rate or throughput may increase.

Although the interactive job described in the example illustrated in FIG. 6 is a read of the distributed file system and the non-interactive requests are write requests for the distributed file system, it is to be understood that both interactive and non-interactive jobs may include read jobs, write jobs, or both. The interactive and non-interactive status of a job may depend on a relative priority assigned to that job, as described with reference to FIG. 2. Although not illustrated in FIG. 6, in some cases, the interactive job may be a write job, and the interactive write requests may be paused due to one or more non-interactive write operations, one or more non-interactive read operations, or both.

The described techniques for synchronizing times at which resources are deposited at different disks 680 performing a same interactive job may thereby improve performance and throughput of job execution in scenarios in which I/O contention may be present. In some examples, as a quantity of disks 680 involved in the synchronization increases, the effects of the synchronization on throughput and performance may also increase.

Figure 7:
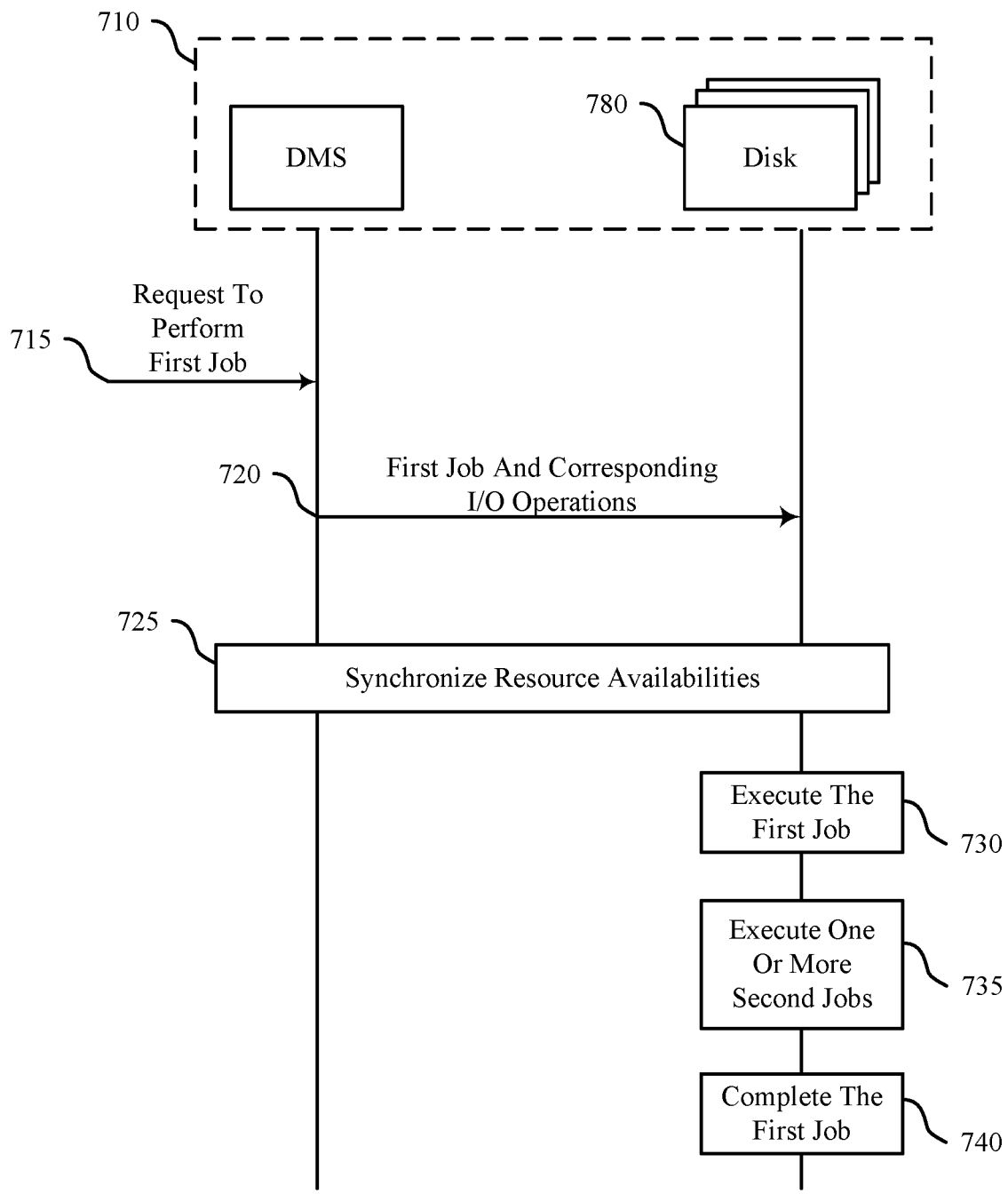
FIG. 7 shows an example of a process flow that supports time synchronization across independent I/O schedulers in accordance with aspects of the present disclosure.

FIG. 7 shows an example of a process flow 700 that supports time synchronization across independent I/O schedulers in accordance with aspects of the present disclosure. The process flow 700 may implement or be implemented by aspects of FIGS. 1-6. For example, the process flow 700 may be implemented by a DMS 710, which may include multiple disks 780, and which may represent examples of corresponding systems and components as described with reference to FIGS. 1-6. The DMS 710 may manage backup and restoration of data within a distributed file system, which may be stored across the multiple disks 780. In this example, the DMS 710 may synchronize resource deposition across multiple I/O schedulers associated with disks 780 that are executing a same interactive job.

In some aspects, the operations illustrated in the process flow 700 may be performed by hardware (e.g., including circuitry, processing blocks, logic components, and other components), code (e.g., software or firmware) executed by a processor, or any combination thereof. For example, aspects of the process flow 700 may be implemented or managed by a DMS, a resource deposition synchronization component, or some other software or application within a DMS that is configured to manage backup and restoration of data and other computing resources within a distributed file system.

At 715, the DMS 710 may receive a request to perform a first job for the distributed file system. The first job may be associated with one or more I/O operations for the distributed file system and may be a read job or a write job. For example, the first job may be to restore backed-up data, which may include reading data relatively quickly, or some other type of job. The DMS 710 may assign a first priority to the first job based on a type of the first job. In some examples, the first priority may be relatively high (e.g., above a threshold priority), and the first job may be referred to as an interactive job accordingly.

At 720, the DMS 710 may send the first job for execution, during a time period, by a set of disks 780. The set of disks 780 may include some or all of the disks 780 included in the DMS 710 over which the distributed file system is stored. The first job may include and may be sent with corresponding one or more I/O operations. The one or more I/O operations may be read or write operations that are also associated with the first priority of the first job. In some examples, I/O schedulers for the disks 780 may receive the I/O operations or requests. In some examples, the I/O schedulers may operate in an interactive mode, or some other mode in which the I/O schedulers may throttle or rate-limit relatively low priority operations, during the time period associated with execution of the first job.

In some examples, the DMS 710 or some other component may send one or more second jobs for execution by one or more disks 780 of the set of disks 780. The one or more second jobs and corresponding I/O operations may be associated with one or more second priorities that are less than the first priority. In some examples, the one or more second priorities may be less than a threshold priority and may be referred to as non-interactive. Respective timings for execution of the one or more second jobs may be based on respective availabilities of resources (e.g., non-interactive I/O resources, tokens, or rate-limiters) at the set of disks 780. For example, based on the I/O schedulers operating in an interactive mode, execution of the second operations associated with the second jobs may be throttled or rate-limited until sufficient resources are available, as described with reference to FIGS. 2-6.

At 725, the DMS 710 may synchronize, during the time period, availabilities of resources across the disks 780. For example, the DMS 710 may instruct or request that I/O schedulers for the disks 780 synchronize or coordinate resource deposition periodicities by using a global system clock or some other synchronization technique.

At 730, the DMS 710 may execute, by the set of disks 780, the first job. Executing the first job may include sequentially performing interactive operations associated with the first job across the set of disks 780.

At 735, the DMS 710 may execute, by one or more disks 780, the one or more second jobs. The DMS 710 may execute the one or more second jobs during execution of the first job, which may pause the first job for a time period. By synchronizing availabilities of resources, the disks 780 may perform the one or more second operations at the same or relatively similar times, such that the first job may be paused for a single time period and may resume once the second jobs are complete. For example, at 740, after the second jobs have been executed, the DMS 710 may complete, using the one or more disks 780, the first job.

The DMS 710 may thereby facilitate resource coordination across multiple I/O schedulers and corresponding disks 780 to improve throughput and reduce latency associated with relatively high priority read or write jobs.

Figure 8:
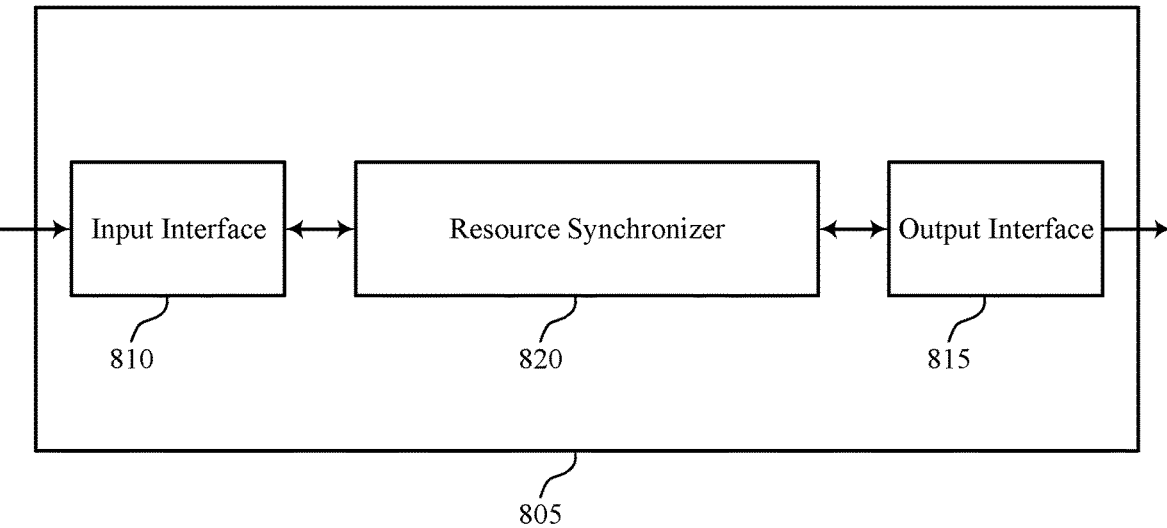
FIGS. 8 and 9 show block diagrams of devices that support time synchronization across independent I/O schedulers in accordance with aspects of the present disclosure.

FIG. 8 shows a block diagram 800 of a system 805 that supports time synchronization across independent I/O schedulers in accordance with aspects of the present disclosure. The system 805 may be an example of aspects of a DMS as described herein. The system 805 may include an input interface 810, an output interface 815, and a resource synchronizer 820. The system 805 may also include a processor. Each of these components may be in communication with one another (e.g., via one or more buses).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the resource synchronizer 820 to support time synchronization across independent I/O schedulers. In some cases, the input interface 810 may be a component of a network interface 1125 as described with reference to FIG. 11.

The output interface 815 may manage output signaling for the system 805. For example, the output interface 815 may receive signaling from other components of the system 805, such as the resource synchronizer 820, and may transmit such output signaling corresponding to (e.g., representative of or otherwise based on) such signaling to other systems or devices. In some cases, the output interface 815 may be a component of a network interface 1125 as described with reference to FIG. 11.

The resource synchronizer 820, the input interface 810, the output interface 815, or various combinations thereof or various components thereof may be examples of means for performing various aspects of time synchronization across independent I/O schedulers as described herein. For example, the resource synchronizer 820, the input interface 810, the output interface 815, or various combinations or components thereof may support a method for performing one or more of the functions described herein.

In some examples, the resource synchronizer 820, the input interface 810, the output interface 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the resource synchronizer 820, the input interface 810, the output interface 815, or various combinations or components thereof may be implemented in code (e.g., as communications management software or firmware) executed by a processor. If implemented in code executed by a processor, the functions of the resource synchronizer 820, the input interface 810, the output interface 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the resource synchronizer 820 may be configured to perform various operations (e.g., receiving, monitoring, transmitting) using or otherwise in cooperation with the input interface 810, the output interface 815, or both. For example, the resource synchronizer 820 may receive information from the input interface 810, send information to the output interface 815, or be integrated in combination with the input interface 810, the output interface 815, or both to receive information, transmit information, or perform various other operations as described herein.

For example, the resource synchronizer 820 may be configured as or otherwise support a means for receiving, at a DMS, a request to perform a first job for a distributed file system, the first job associated with one or more I/O operations for the distributed file system, where the DMS includes a set of multiple disks and the distributed file system is stored across the set of multiple disks. The resource synchronizer 820 may be configured as or otherwise support a means for sending the first job for execution, during a time period, by a set of disks from among the set of multiple disks, the first job and corresponding one or more I/O operations associated with a first priority that is higher than second priorities associated with one or more second jobs for execution by the set of disks, where respective timings of execution of the one or more second jobs by the set of disks during the time period are based on respective availabilities of resources at the set of disks that are associated with execution of the one or more second jobs. The resource synchronizer 820 may be configured as or otherwise support a means for synchronizing, during the time period and across the set of disks, the respective availabilities of resources based on the set of disks executing the first job.

By including or configuring the resource synchronizer 820 in accordance with examples as described herein, the system 805 (e.g., a processor controlling or otherwise coupled with the input interface 810, the output interface 815, the resource synchronizer 820, or a combination thereof) may support techniques for reduced processing, reduced latency and improved efficiency of execution of read or write jobs in a distributed file system, and improved throughput for I/O operations in a distributed file system, among other advantages.

Figure 9:
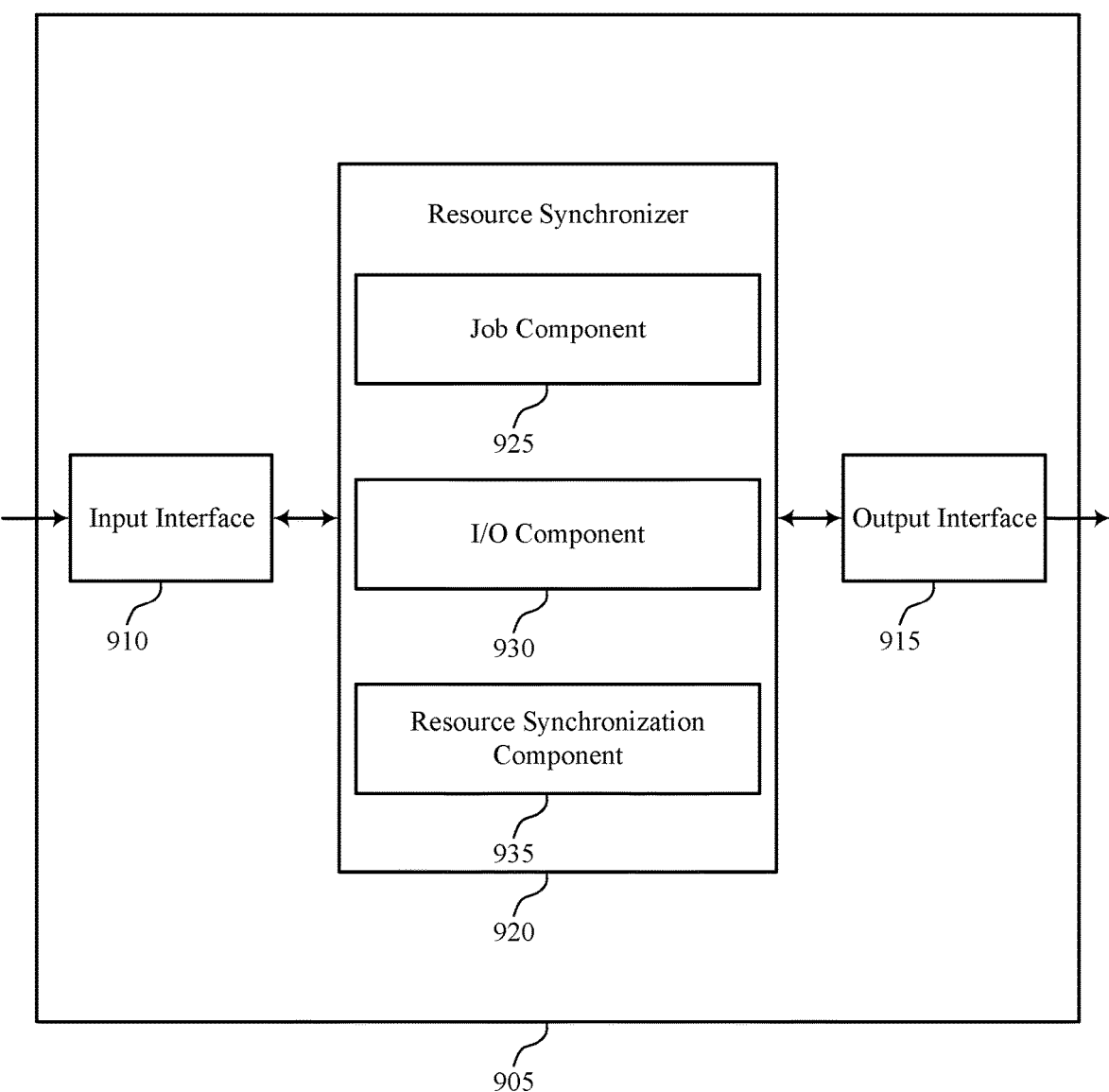

FIG. 9 shows a block diagram 900 of a system 905 that supports time synchronization across independent I/O schedulers in accordance with aspects of the present disclosure. In some examples, the system 905 may be an example of aspects of one or more components described with reference to FIG. 1, such as a DMS 110. The system 905 may be an example of aspects of a system 805 or a DMS 110 as described herein. The system 905 may include an input interface 910, an output interface 915, and a resource synchronizer 920. The system 905 may also include one or more processors. Each of these components may be in communication with one another (e.g., via one or more buses, communications links, communications interfaces, or any combination thereof).

The input interface 910 may manage input signaling for the system 905. For example, the input interface 910 may receive input signaling (e.g., messages, packets, data, instructions, commands, or any other form of encoded information) from other systems or devices. The input interface 910 may send signaling corresponding to (e.g., representative of or otherwise based on) such input signaling to other components of the system 905 for processing. For example, the input interface 910 may transmit such corresponding signaling to the resource synchronizer 920 to support time synchronization across independent I/O schedulers. In some cases, the input interface 910 may be a component of a network interface 1125 as described with reference to FIG. 11.

The output interface 915 may manage output signaling for the system 905. For example, the output interface 915 may receive signaling from other components of the system 905, such as the resource synchronizer 920, and may transmit such output signaling corresponding to (e.g., representative of or otherwise based on) such signaling to other systems or devices. In some cases, the output interface 915 may be a component of a network interface 1125 as described with reference to FIG. 11.

The system 905, or various components thereof, may be an example of means for performing various aspects of time synchronization across independent I/O schedulers as described herein. For example, the resource synchronizer 920 may include a job component 925, an I/O component 930, a resource synchronization component 935, or any combination thereof. The resource synchronizer 920 may be an example of aspects of a resource synchronizer 820 as described herein. In some examples, the resource synchronizer 920, or various components thereof, may be configured to perform various operations (e.g., receiving, monitoring, transmitting) using or otherwise in cooperation with the input interface 910, the output interface 915, or both. For example, the resource synchronizer 920 may receive information from the input interface 910, send information to the output interface 915, or be integrated in combination with the input interface 910, the output interface 915, or both to receive information, transmit information, or perform various other operations as described herein.

The job component 925 may be configured as or otherwise support a means for receiving, at a DMS, a request to perform a first job for a distributed file system, the first job associated with one or more I/O operations for the distributed file system, where the DMS includes a set of multiple disks and the distributed file system is stored across the set of multiple disks. The I/O component 930 may be configured as or otherwise support a means for sending the first job for execution, during a time period, by a set of disks from among the set of multiple disks, the first job and corresponding one or more I/O operations associated with a first priority that is higher than second priorities associated with one or more second jobs for execution by the set of disks, where respective timings of execution of the one or more second jobs by the set of disks during the time period are based on respective availabilities of resources at the set of disks that are associated with execution of the one or more second jobs. The resource synchronization component 935 may be configured as or otherwise support a means for synchronizing, during the time period and across the set of disks, the respective availabilities of resources based on the set of disks executing the first job.

Figure 10:
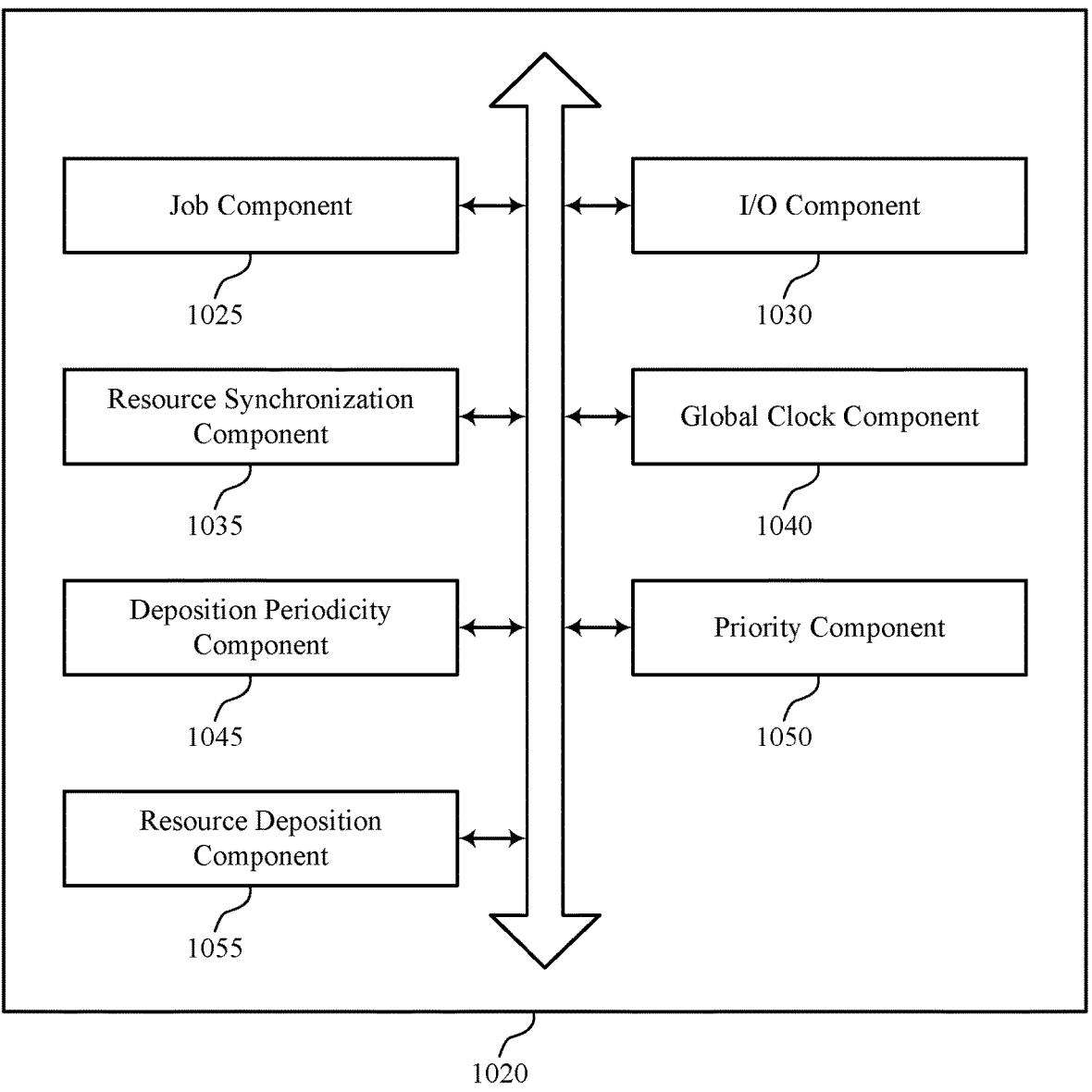
FIG. 10 shows a block diagram of a resource synchronizer that supports time synchronization across independent I/O schedulers in accordance with aspects of the present disclosure.

FIG. 10 shows a block diagram 1000 of a resource synchronizer 1020 that supports time synchronization across independent I/O schedulers in accordance with aspects of the present disclosure. The resource synchronizer 1020 may be an example of aspects of a resource synchronizer 820, a resource synchronizer 920, or both, as described herein. The resource synchronizer 1020, or various components thereof, may be an example of means for performing various aspects of time synchronization across independent I/O schedulers as described herein. For example, the resource synchronizer 1020 may include a job component 1025, an I/O component 1030, a resource synchronization component 1035, a global clock component 1040, a deposition periodicity component 1045, a priority component 1050, a resource deposition component 1055, or any combination thereof. Each of these components may communicate, directly or indirectly, with one another (e.g., via one or more buses, communications links, communications interfaces, or any combination thereof).

The job component 1025 may be configured as or otherwise support a means for receiving, at a DMS, a request to perform a first job for a distributed file system, the first job associated with one or more I/O operations for the distributed file system, where the DMS includes a set of multiple disks and the distributed file system is stored across the set of multiple disks. The I/O component 1030 may be configured as or otherwise support a means for sending the first job for execution, during a time period, by a set of disks from among the set of multiple disks, the first job and corresponding one or more I/O operations associated with a first priority that is higher than second priorities associated with one or more second jobs for execution by the set of disks, where respective timings of execution of the one or more second jobs by the set of disks during the time period are based on respective availabilities of resources at the set of disks that are associated with execution of the one or more second jobs. The resource synchronization component 1035 may be configured as or otherwise support a means for synchronizing, during the time period and across the set of disks, the respective availabilities of resources based on the set of disks executing the first job.

In some examples, to support synchronizing the respective availabilities of the resources, the global clock component 1040 may be configured as or otherwise support a means for synchronizing the respective availabilities of the resources at the set of disks in accordance with a global clock of the DMS, where the synchronizing is performed at a disk of the set of disks independently from other disks of the set of disks based on the global clock of the DMS.

In some examples, to support synchronizing the respective availabilities of the resources, the deposition periodicity component 1045 may be configured as or otherwise support a means for synchronizing, across the set of disks during the time period based on the set of disks executing the first job, respective start times for a resource deposition periodicity, where disks of the set of disks deposit respective sets of resources within a threshold time period of one another based on synchronizing the respective start times for the resource deposition periodicity.

In some examples, the deposition periodicity component 1045 may be configured as or otherwise support a means for depositing, at a disk of the set of disks, a first set of resources at a respective starting time for the resource deposition periodicity. In some examples, the deposition periodicity component 1045 may be configured as or otherwise support a means for depositing, at the disk of the set of disks, one or more second sets of resources at one or more second times after the respective starting time in accordance with the resource deposition periodicity.

In some examples, the job component 1025 may be configured as or otherwise support a means for initiating, by at least two disks of the set of disks, execution of the one or more second jobs within the threshold time period based on available resources deposited in accordance with the synchronized respective start times for the resource deposition periodicity.

In some examples, the resource deposition periodicity is the same across the set of disks.

In some examples, the resource deposition component 1055 may be configured as or otherwise support a means for determining that a quantity of jobs for the distributed file system associated with a priority above a threshold priority level are performed within a first time period. In some examples, the resource deposition component 1055 may be configured as or otherwise support a means for determining a quantity of resources included in the respective sets of resources deposited within the threshold time period based on the quantity of jobs performed within the first time period.

In some examples, the job component 1025 may be configured as or otherwise support a means for executing, by the set of disks during the time period, the first job. In some examples, the job component 1025 may be configured as or otherwise support a means for executing, by at least two disks of the set of disks during a second time period, the one or more second jobs based on synchronizing the respective availabilities of resources across the set of disks, where execution of the first job by the set of disks is paused during the second time period based on executing the one or more second jobs.

In some examples, to support executing the first job, the I/O component 1030 may be configured as or otherwise support a means for writing or reading a first chunk of data from among the set of data to or from the set of disks within a first time period. In some examples, to support executing the first job, the I/O component 1030 may be configured as or otherwise support a means for writing or reading remaining chunks of data from among the set of data to the set of disks within one or more second time periods that begin after the first time period.

In some examples, to support writing or reading a chunk of data from among the set of data to the set of disks, the I/O component 1030 may be configured as or otherwise support a means for writing or reading a first slice of data from among the chunk of data to a first disk of the set of disks at a first time. In some examples, to support writing or reading a chunk of data from among the set of data to the set of disks, the I/O component 1030 may be configured as or otherwise support a means for writing or reading remaining slices of data from among the chunk of data to remaining disks of the set of disks at respective second times that are after the first time.

In some examples, to support executing a second job of the one or more second jobs, the I/O component 1030 may be configured as or otherwise support a means for writing or reading data associated with the second job to or from a respective disk of the set of disks during the second time period, where the second job is associated with one or more write or read operations for the respective disk.

In some examples, the priority component 1050 may be configured as or otherwise support a means for determining the first priority of the first job based on a first type of the first job, where the one or more I/O operations are associated with the first priority. In some examples, the priority component 1050 may be configured as or otherwise support a means for determining the second priorities of the one or more second jobs based on second types of the one or more second jobs, where the one or more second jobs are associated with one or more second I/O operations, and the one or more second I/O operations are associated with the second priorities.

Figure 11:
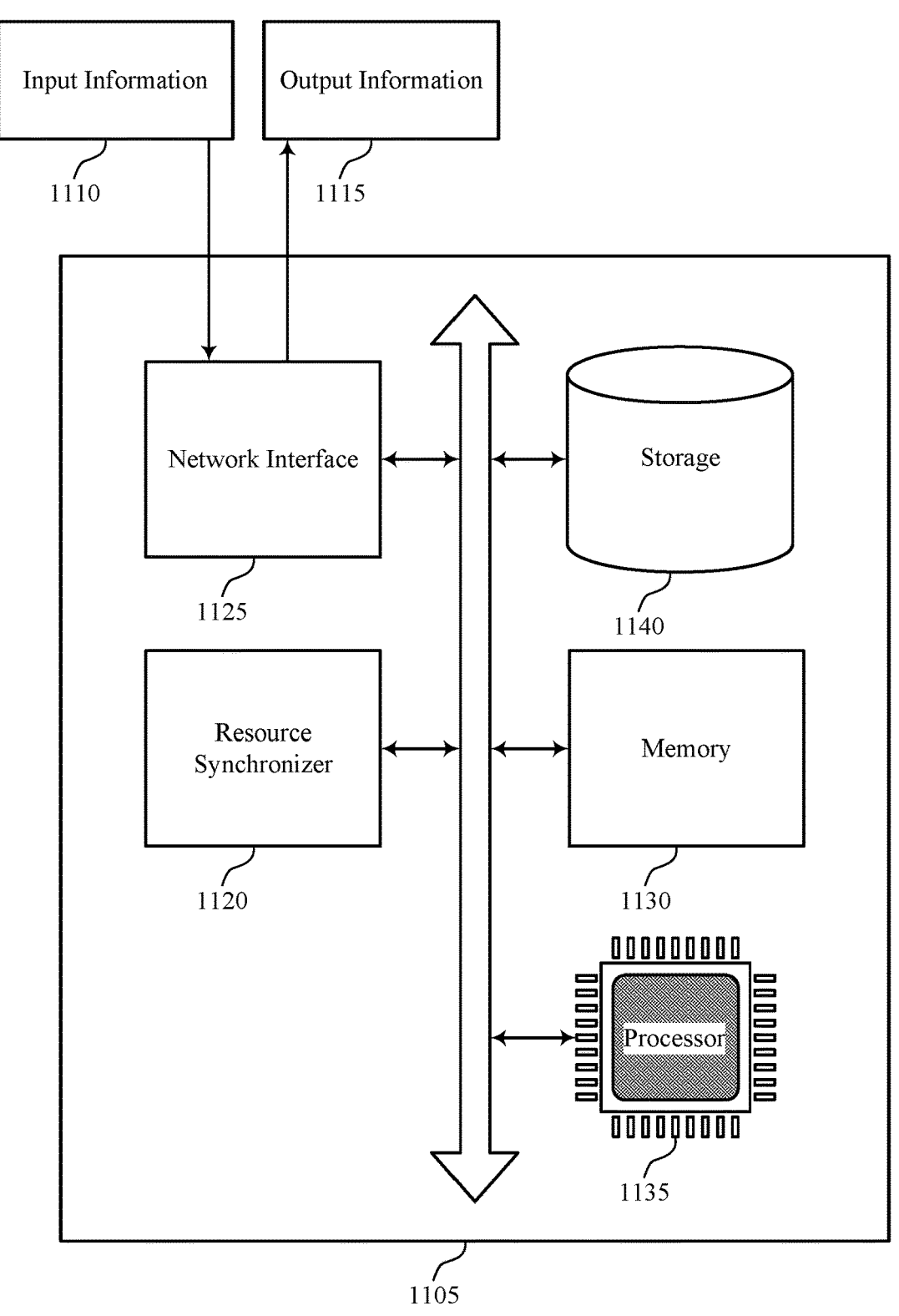
FIG. 11 shows a diagram of a system including a device that supports time synchronization across independent I/O schedulers in accordance with aspects of the present disclosure.

FIG. 11 shows a block diagram 1100 of a system 1105 that supports time synchronization across independent I/O schedulers in accordance with aspects of the present disclosure. The system 1105 may be an example of or include the components of a system 805, a system 905, or a DMS as described herein. The system 1105 may include components for data management, including components such as a resource synchronizer 1120, an input information 1110, an output information 1115, a network interface 1125, a memory 1130, a processor 1135, and a storage 1140. These components may be in electronic communication or otherwise coupled with each other (e.g., operatively, communicatively, functionally, electronically, electrically: via one or more buses, communications links, communications interfaces, or any combination thereof). Additionally, the components of the system 1105 may include corresponding physical components or may be implemented as corresponding virtual components (e.g., components of one or more virtual machines). In some examples, the system 1105 may be an example of aspects of one or more components described with reference to FIG. 1, such as a DMS 110.

The network interface 1125 may enable the system 1105 to exchange information (e.g., input information 1110, output information 1115, or both) with other systems or devices (not shown). For example, the network interface 1125 may enable the system 1105 to connect to a network (e.g., a network 120 as described herein). The network interface 1125 may include one or more wireless network interfaces, one or more wired network interfaces, or any combination thereof. In some examples, the network interface 1125 may be an example of may be an example of aspects of one or more components described with reference to FIG. 1, such as one or more network interfaces 165.

Memory 1130 may include RAM, ROM, or both. The memory 1130 may store computer-readable, computer-executable software including instructions that, when executed, cause the processor 1135 to perform various functions described herein. In some cases, the memory 1130 may contain, among other things, a basic I/O system (BIOS), which may control basic hardware or software operation such as the interaction with peripheral components or devices. In some cases, the memory 1130 may be an example of aspects of one or more components described with reference to FIG. 1, such as one or more memories 175.

The processor 1135 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 1135 may be configured to execute computer-readable instructions stored in a memory 1130 to perform various functions (e.g., functions or tasks supporting time synchronization across independent I/O schedulers). Though a single processor 1135 is depicted in the example of FIG. 11, it is to be understood that the system 1105 may include any quantity of one or more of processors 1135 and that a group of processors 1135 may collectively perform one or more functions ascribed herein to a processor, such as the processor 1135. In some cases, the processor 1135 may be an example of aspects of one or more components described with reference to FIG. 1, such as one or more processors 170.

Storage 1140 may be configured to store data that is generated, processed, stored, or otherwise used by the system 1105. In some cases, the storage 1140 may include one or more HDDs, one or more SDDs, or both. In some examples, the storage 1140 may be an example of a single database, a distributed database, multiple distributed databases, a data store, a data lake, or an emergency backup database. In some examples, the storage 1140 may be an example of one or more components described with reference to FIG. 1, such as one or more network disks 180.

For example, the resource synchronizer 1120 may be configured as or otherwise support a means for receiving, at a DMS, a request to perform a first job for a distributed file system, the first job associated with one or more I/O operations for the distributed file system, where the DMS includes a set of multiple disks and the distributed file system is stored across the set of multiple disks. The resource synchronizer 1120 may be configured as or otherwise support a means for sending the first job for execution, during a time period, by a set of disks from among the set of multiple disks, the first job and corresponding one or more I/O operations associated with a first priority that is higher than second priorities associated with one or more second jobs for execution by the set of disks, where respective timings of execution of the one or more second jobs by the set of disks during the time period are based on respective availabilities of resources at the set of disks that are associated with execution of the one or more second jobs. The resource synchronizer 1120 may be configured as or otherwise support a means for synchronizing, during the time period and across the set of disks, the respective availabilities of resources based on the set of disks executing the first job.

By including or configuring the resource synchronizer 1120 in accordance with examples as described herein, the system 1105 may support techniques for time synchronization across independent I/O schedulers, which may provide one or more benefits such as, for example, reduced processing, reduced power and resource consumption, improved efficiency and reduced latency for executing read and write jobs across multiple disks, improved throughput for read and write jobs, and improved synchronization between I/O schedulers supported by the DMS, among other advantages.

FIG. 12 shows a flowchart illustrating a method 1200 that supports time synchronization across independent I/O schedulers in accordance with aspects of the present disclosure. The operations of the method 1200 may be implemented by a DMS or its components as described herein. For example, the operations of the method 1200 may be performed by a DMS as described with reference to FIGS. 1 through 11. In some examples, a DMS may execute a set of instructions to control the functional elements of the wireless DMS to perform the described functions. Additionally, or alternatively, the wireless DMS may perform aspects of the described functions using special-purpose hardware.

At 1205, the method may include receiving, at a DMS, a request to perform a first job for a distributed file system, the first job associated with one or more I/O operations for the distributed file system, where the DMS includes a set of multiple disks and the distributed file system is stored across the set of multiple disks. The operations of 1205 may be performed in accordance with examples as disclosed herein. In some examples, aspects of the operations of 1205 may be performed by a job component 1025 as described with reference to FIG. 10.

At 1210, the method may include sending the first job for execution, during a time period, by a set of disks from among the set of multiple disks, the first job and corresponding one or more I/O operations associated with a first priority that is higher than second priorities associated with one or more second jobs for execution by the set of disks, where respective timings of execution of the one or more second jobs by the set of disks during the time period are based on respective availabilities of resources at the set of disks that are associated with execution of the one or more second jobs. The operations of 1210 may be performed in accordance with examples as disclosed herein. In some examples, aspects of the operations of 1210 may be performed by an I/O component 1030 as described with reference to FIG. 10.

At 1215, the method may include synchronizing, during the time period and across the set of disks, the respective availabilities of resources based on the set of disks executing the first job. The operations of 1215 may be performed in accordance with examples as disclosed herein. In some examples, aspects of the operations of 1215 may be performed by a resource synchronization component 1035 as described with reference to FIG. 10.

FIG. 13 shows a flowchart illustrating a method 1300 that supports time synchronization across independent I/O schedulers in accordance with aspects of the present disclosure. The operations of the method 1300 may be implemented by a DMS or its components as described herein. For example, the operations of the method 1300 may be performed by a DMS as described with reference to FIGS. 1 through 11. In some examples, a DMS may execute a set of instructions to control the functional elements of the wireless DMS to perform the described functions. Additionally, or alternatively, the wireless DMS may perform aspects of the described functions using special-purpose hardware.

At 1305, the method may include receiving, at a DMS, a request to perform a first job for a distributed file system, the first job associated with one or more I/O operations for the distributed file system, where the DMS includes a set of multiple disks and the distributed file system is stored across the set of multiple disks. The operations of 1305 may be performed in accordance with examples as disclosed herein. In some examples, aspects of the operations of 1305 may be performed by a job component 1025 as described with reference to FIG. 10.

At 1310, the method may include sending the first job for execution, during a time period, by a set of disks from among the set of multiple disks, the first job and corresponding one or more I/O operations associated with a first priority that is higher than second priorities associated with one or more second jobs for execution by the set of disks, where respective timings of execution of the one or more second jobs by the set of disks during the time period are based on respective availabilities of resources at the set of disks that are associated with execution of the one or more second jobs. The operations of 1310 may be performed in accordance with examples as disclosed herein. In some examples, aspects of the operations of 1310 may be performed by an I/O component 1030 as described with reference to FIG. 10.

At 1315, the method may include synchronizing, during the time period and across the set of disks, the respective availabilities of resources based on the set of disks executing the first job. The operations of 1315 may be performed in accordance with examples as disclosed herein. In some examples, aspects of the operations of 1315 may be performed by a resource synchronization component 1035 as described with reference to FIG. 10.

At 1320, the method may include synchronizing the respective availabilities of the resources at the set of disks in accordance with a global clock of the DMS, where the synchronizing is performed at a disk of the set of disks independently from other disks of the set of disks based on the global clock of the DMS. The operations of 1320 may be performed in accordance with examples as disclosed herein. In some examples, aspects of the operations of 1320 may be performed by a global clock component 1040 as described with reference to FIG. 10.

FIG. 14 shows a flowchart illustrating a method 1400 that supports time synchronization across independent I/O schedulers in accordance with aspects of the present disclosure. The operations of the method 1400 may be implemented by a DMS or its components as described herein. For example, the operations of the method 1400 may be performed by a DMS as described with reference to FIGS. 1 through 11. In some examples, a DMS may execute a set of instructions to control the functional elements of the wireless DMS to perform the described functions. Additionally, or alternatively, the wireless DMS may perform aspects of the described functions using special-purpose hardware.

At 1405, the method may include receiving, at a DMS, a request to perform a first job for a distributed file system, the first job associated with one or more I/O operations for the distributed file system, where the DMS includes a set of multiple disks and the distributed file system is stored across the set of multiple disks. The operations of 1405 may be performed in accordance with examples as disclosed herein. In some examples, aspects of the operations of 1405 may be performed by a job component 1025 as described with reference to FIG. 10.

At 1410, the method may include sending the first job for execution, during a time period, by a set of disks from among the set of multiple disks, the first job and corresponding one or more I/O operations associated with a first priority that is higher than second priorities associated with one or more second jobs for execution by the set of disks, where respective timings of execution of the one or more second jobs by the set of disks during the time period are based on respective availabilities of resources at the set of disks that are associated with execution of the one or more second jobs. The operations of 1410 may be performed in accordance with examples as disclosed herein. In some examples, aspects of the operations of 1410 may be performed by an I/O component 1030 as described with reference to FIG. 10.

At 1415, the method may include synchronizing, during the time period and across the set of disks, the respective availabilities of resources based on the set of disks executing the first job. The operations of 1415 may be performed in accordance with examples as disclosed herein. In some examples, aspects of the operations of 1415 may be performed by a resource synchronization component 1035 as described with reference to FIG. 10.

At 1420, the method may include executing, by the set of disks during the time period, the first job. The operations of 1420 may be performed in accordance with examples as disclosed herein. In some examples, aspects of the operations of 1420 may be performed by a job component 1025 as described with reference to FIG. 10.

At 1425, the method may include executing, by at least two disks of the set of disks during a second time period, the one or more second jobs based on synchronizing the respective availabilities of resources across the set of disks, where execution of the first job by the set of disks is paused during the second time period based on executing the one or more second jobs. The operations of 1425 may be performed in accordance with examples as disclosed herein. In some examples, aspects of the operations of 1425 may be performed by a job component 1025 as described with reference to FIG. 10.

A method is described. The method may include receiving, at a DMS, a request to perform a first job for a distributed file system, the first job associated with one or more I/O operations for the distributed file system, where the DMS includes a set of multiple disks and the distributed file system is stored across the set of multiple disks, sending the first job for execution, during a time period, by a set of disks from among the set of multiple disks, the first job and corresponding one or more I/O operations associated with a first priority that is higher than second priorities associated with one or more second jobs for execution by the set of disks, where respective timings of execution of the one or more second jobs by the set of disks during the time period are based on respective availabilities of resources at the set of disks that are associated with execution of the one or more second jobs, and synchronizing, during the time period and across the set of disks, the respective availabilities of resources based on the set of disks executing the first job.

An apparatus is described. The apparatus may include a processor, memory coupled with the processor, and instructions stored in the memory. The instructions may be executable by the processor to cause the apparatus to receive, at a DMS, a request to perform a first job for a distributed file system, the first job associated with one or more I/O operations for the distributed file system, where the DMS includes a set of multiple disks and the distributed file system is stored across the set of multiple disks, send the first job for execution, during a time period, by a set of disks from among the set of multiple disks, the first job and corresponding one or more I/O operations associated with a first priority that is higher than second priorities associated with one or more second jobs for execution by the set of disks, where respective timings of execution of the one or more second jobs by the set of disks during the time period are based on respective availabilities of resources at the set of disks that are associated with execution of the one or more second jobs, and synchronize, during the time period and across the set of disks, the respective availabilities of resources based on the set of disks executing the first job.

Another apparatus is described. The apparatus may include means for receiving, at a DMS, a request to perform a first job for a distributed file system, the first job associated with one or more I/O operations for the distributed file system, where the DMS includes a set of multiple disks and the distributed file system is stored across the set of multiple disks, means for sending the first job for execution, during a time period, by a set of disks from among the set of multiple disks, the first job and corresponding one or more I/O operations associated with a first priority that is higher than second priorities associated with one or more second jobs for execution by the set of disks, where respective timings of execution of the one or more second jobs by the set of disks during the time period are based on respective availabilities of resources at the set of disks that are associated with execution of the one or more second jobs, and means for synchronizing, during the time period and across the set of disks, the respective availabilities of resources based on the set of disks executing the first job.

A non-transitory computer-readable medium storing code is described. The code may include instructions executable by a processor to receive, at a DMS, a request to perform a first job for a distributed file system, the first job associated with one or more I/O operations for the distributed file system, where the DMS includes a set of multiple disks and the distributed file system is stored across the set of multiple disks, send the first job for execution, during a time period, by a set of disks from among the set of multiple disks, the first job and corresponding one or more I/O operations associated with a first priority that is higher than second priorities associated with one or more second jobs for execution by the set of disks, where respective timings of execution of the one or more second jobs by the set of disks during the time period are based on respective availabilities of resources at the set of disks that are associated with execution of the one or more second jobs, and synchronize, during the time period and across the set of disks, the respective availabilities of resources based on the set of disks executing the first job.

In some examples of the method, apparatuses, and non-transitory computer-readable medium described herein, synchronizing the respective availabilities of the resources may include operations, features, means, or instructions for synchronizing the respective availabilities of the resources at the set of disks in accordance with a global clock of the DMS, where the synchronizing may be performed at a disk of the set of disks independently from other disks of the set of disks based on the global clock of the DMS.

In some examples of the method, apparatuses, and non-transitory computer-readable medium described herein, synchronizing the respective availabilities of the resources may include operations, features, means, or instructions for synchronizing, across the set of disks during the time period based on the set of disks executing the first job, respective start times for a resource deposition periodicity, where disks of the set of disks deposit respective sets of resources within a threshold time period of one another based on synchronizing the respective start times for the resource deposition periodicity.

Some examples of the method, apparatuses, and non-transitory computer-readable medium described herein may further include operations, features, means, or instructions for depositing, at a disk of the set of disks, a first set of resources at a respective starting time for the resource deposition periodicity and depositing, at the disk of the set of disks, one or more second sets of resources at one or more second times after the respective starting time in accordance with the resource deposition periodicity.

Some examples of the method, apparatuses, and non-transitory computer-readable medium described herein may further include operations, features, means, or instructions for initiating, by at least two disks of the set of disks, execution of the one or more second jobs within the threshold time period based on available resources deposited in accordance with the synchronized respective start times for the resource deposition periodicity.

In some examples of the method, apparatuses, and non-transitory computer-readable medium described herein, the resource deposition periodicity may be the same across the set of disks.

Some examples of the method, apparatuses, and non-transitory computer-readable medium described herein may further include operations, features, means, or instructions for determining that a quantity of jobs for the distributed file system associated with a priority above a threshold priority level may be performed within a first time period and determining a quantity of resources included in the respective sets of resources deposited within the threshold time period based on the quantity of jobs performed within the first time period.

Some examples of the method, apparatuses, and non-transitory computer-readable medium described herein may further include operations, features, means, or instructions for executing, by the set of disks during the time period, the first job and executing, by at least two disks of the set of disks during a second time period, the one or more second jobs based on synchronizing the respective availabilities of resources across the set of disks, where execution of the first job by the set of disks may be paused during the second time period based on executing the one or more second jobs.

In some examples of the method, apparatuses, and non-transitory computer-readable medium described herein, executing the first job may include operations, features, means, or instructions for writing or reading a first chunk of data from among the set of data to or from the set of disks within a first time period and writing or reading remaining chunks of data from among the set of data to the set of disks within one or more second time periods that begin after the first time period.

In some examples of the method, apparatuses, and non-transitory computer-readable medium described herein, writing or reading a chunk of data from among the set of data to the set of disks may include operations, features, means, or instructions for writing or reading a first slice of data from among the chunk of data to a first disk of the set of disks at a first time and writing or reading remaining slices of data from among the chunk of data to remaining disks of the set of disks at respective second times that may be after the first time.

In some examples of the method, apparatuses, and non-transitory computer-readable medium described herein, executing a second job of the one or more second jobs may include operations, features, means, or instructions for writing or reading data associated with the second job to or from a respective disk of the set of disks during the second time period, where the second job may be associated with one or more write or read operations for the respective disk.

Some examples of the method, apparatuses, and non-transitory computer-readable medium described herein may further include operations, features, means, or instructions for determining the first priority of the first job based on a first type of the first job, where the one or more I/O operations may be associated with the first priority and determining the second priorities of the one or more second jobs based on second types of the one or more second jobs, where the one or more second jobs may be associated with one or more second I/O operations, and the one or more second I/O operations may be associated with the second priorities.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving, at a data management system, a request to perform a first job for a distributed file system, the first job associated with one or more input/output operations for the distributed file system, wherein the data management system comprises a plurality of disks and the distributed file system is stored across the plurality of disks;
   sending, by the data management system, the first job for execution, during a time period, by a set of multiple different disks from among the plurality of disks, the first job and corresponding one or more input/output operations associated with a first priority, wherein the first priority is based at least in part on a first type of the first job and the first priority is higher than second priorities associated with one or more second jobs for execution by the set of multiple different disks, and wherein the second priorities of the one or more second jobs are based at least in part on second types of the one or more second jobs; and
   synchronizing, during the time period and across the set of multiple different disks, respective availabilities of resources associated with the one or more second jobs based at least in part on the set of multiple different disks executing the first job during the time period, wherein;
      respective timings of execution of the one or more second jobs by the set of multiple different disks during the time period are based at least in part on the respective availabilities of resources at the set of multiple different disks that are associated with execution of the one or more second jobs,
      execution of the first job is paused at the set of multiple different disks during a second time period associated with the execution of the one or more second jobs based at least in part on the first priority associated with the first job being higher than the second priorities associated with the one or more second jobs, and the second time period is within the time period.

2. The method of claim 1, wherein synchronizing the respective availabilities of the resources comprises:
   synchronizing the respective availabilities of the resources at the set of multiple different disks in accordance with a global clock of the data management system, wherein the synchronizing is performed at a disk of the set of multiple different disks independently from other disks of the set of multiple different disks based at least in part on the global clock of the data management system.

3. The method of claim 1, wherein synchronizing the respective availabilities of the resources comprises:
   synchronizing, across the set of multiple different disks during the time period based at least in part on the set of multiple different disks executing the first job, respective start times for a resource deposition periodicity, wherein disks of the set of multiple different disks deposit respective sets of resources within a threshold time period of one another based at least in part on synchronizing the respective start times for the resource deposition periodicity.

4. The method of claim 3, further comprising:
   depositing, at a disk of the set of multiple different disks, a first set of resources at a respective starting time for the resource deposition periodicity; and
   depositing, at the disk of the set of multiple different disks, one or more second sets of resources at one or more second times after the respective starting time in accordance with the resource deposition periodicity.

5. The method of claim 3, further comprising:
   initiating, by at least two disks of the set of multiple different disks, execution of the one or more second jobs within the threshold time period based at least in part on available resources deposited in accordance with the synchronized respective start times for the resource deposition periodicity.

6. The method of claim 3, wherein the resource deposition periodicity is the same across the set of multiple different disks.

7. The method of claim 3, further comprising:
   determining that a quantity of jobs for the distributed file system associated with a priority above a threshold priority level are performed within a first time period; and
   determining a quantity of resources included in the respective sets of resources deposited within the threshold time period based at least in part on the quantity of jobs performed within the first time period.

8. The method of claim 1, further comprising:
   executing, by the set of multiple different disks during the time period, the first job; and
   executing, by at least two disks of the set of multiple different disks during the second time period, the one or more second jobs based at least in part on synchronizing the respective availabilities of resources across the set of multiple different disks, wherein execution of the first job by the set of multiple different disks is paused during the second time period based at least in part on executing the one or more second jobs.

9. The method of claim 8, wherein the first job is associated with one or more write or read operations associated with a set of data of the distributed file system, and wherein executing the first job comprises:

writing or reading a first chunk of data from among the set of data to or from the set of multiple different disks within a first time period; and writing or reading remaining chunks of data from among the set of data to the set of multiple different disks within one or more second time periods that begin after the first time period.

10. The method of claim 9, wherein writing or reading a chunk of data from among the set of data to the set of multiple different disks comprises:

writing or reading a first slice of data from among the chunk of data to a first disk of the set of multiple different disks at a first time; and writing or reading remaining slices of data from among the chunk of data to remaining disks of the set of multiple different disks at respective second times that are after the first time.

11. The method of claim 8, wherein executing a second job of the one or more second jobs comprises:

writing or reading data associated with the second job to or from a respective disk of the set of multiple different disks during the second time period, wherein the second job is associated with one or more write or read operations for the respective disk.

12. The method of claim 1, further comprising:

determining the first priority of the first job based at least in part on the first type of the first job, wherein the one or more input/output operations are associated with the first priority; and determining the second priorities of the one or more second jobs based at least in part on the second types of the one or more second jobs, wherein the one or more second jobs are associated with one or more second input/output operations, and the one or more second input/output operations are associated with the second priorities.

13. An apparatus, comprising:

one or more processors;

memory coupled with the one or more processors; and instructions stored in the memory and executable by the one or more processors to cause the apparatus to:

receive, at a data management system, a request to perform a first job for a distributed file system, the first job associated with one or more input/output operations for the distributed file system, wherein the data management system comprises a plurality of disks and the distributed file system is stored across the plurality of disks;

send the first job for execution, during a time period, by a set of multiple different disks from among the plurality of disks, the first job and corresponding one or more input/output operations associated with a first priority, wherein the first priority is based at least in part on a first type of the first job and the first priority is higher than second priorities associated with one or more second jobs for execution by the set of multiple different disks, and wherein the second priorities of the one or more second jobs are based at least in part on second types of the one or more second jobs; and synchronize, during the time period and across the set of multiple different disks, respective availabilities of resources associated with the one or more second jobs based at least in part on the set of multiple different disks executing the first job during the time period, wherein:

respective timings of execution of the one or more second jobs by the set of multiple different disks during the time period are based at least in part on the respective availabilities of resources at the set of multiple different disks that are associated with execution of the one or more second jobs, execution of the first job is paused at the set of multiple different disks during a second time period associated with the execution of the one or more second jobs based at least in part on the first priority associated with the first job being higher than the second priorities associated with the one or more second jobs, and the second time period is within the time period.

14. The apparatus of claim 13, wherein the instructions to synchronize the respective availabilities of the resources are executable by the one or more processors to cause the apparatus to:

synchronize the respective availabilities of the resources at the set of multiple different disks in accordance with a global clock of the data management system, wherein the synchronizing is performed at a disk of the set of multiple different disks independently from other disks of the set of multiple different disks based at least in part on the global clock of the data management system.

15. The apparatus of claim 13, wherein the instructions to synchronize the respective availabilities of the resources are executable by the one or more processors to cause the apparatus to:

synchronize, across the set of multiple different disks during the time period based at least in part on the set of multiple different disks executing the first job, respective start times for a resource deposition periodicity, wherein disks of the set of multiple different disks deposit respective sets of resources within a threshold time period of one another based at least in part on synchronizing the respective start times for the resource deposition periodicity.

16. The apparatus of claim 15, wherein the instructions are further executable by the one or more processors to cause the apparatus to:

deposit, at a disk of the set of multiple different disks, a first set of resources at a respective starting time for the resource deposition periodicity; and deposit, at the disk of the set of multiple different disks, one or more second sets of resources at one or more second times after the respective starting time in accordance with the resource deposition periodicity.

17. The apparatus of claim 15, wherein the instructions are further executable by the one or more processors to cause the apparatus to:

initiate, by at least two disks of the set of multiple different disks, execution of the one or more second jobs within the threshold time period based at least in part on available resources deposited in accordance with the synchronized respective start times for the resource deposition periodicity.

18. A non-transitory computer-readable medium storing code, the code comprising instructions executable by one or more processors to:

receive, at a data management system, a request to perform a first job for a distributed file system, the first job associated with one or more input/output operations for the distributed file system, wherein the data management system comprises a plurality of disks and the distributed file system is stored across the plurality of disks;

send the first job for execution, during a time period, by a set of multiple different disks from among the plurality of disks, the first job and corresponding one or more input/output operations associated with a first priority, wherein the first priority is based at least in part on a first type of the first job and the first priority is higher than second priorities associated with one or more second jobs for execution by the set of multiple different disks, and wherein the second priorities of the one or more second jobs are based at least in part on second types of the one or more second jobs; and synchronize, during the time period and across the set of multiple different disks, respective availabilities of resources associated with the one or more second jobs based at least in part on the set of multiple different disks executing the first job during the time period, wherein:

respective timings of execution of the one or more second jobs by the set of multiple different disks during the time period are based at least in part on the respective availabilities of resources at the set of multiple different disks that are associated with execution of the one or more second jobs, execution of the first job is paused at the set of multiple different disks during a second time period associated with the execution of the one or more second jobs based at least in part on the first priority associated with the first job being higher than the second priorities associated with the one or more second jobs, and the second time period is within the time period.

19. The non-transitory computer-readable medium of claim 18, wherein the instructions to synchronize the respective availabilities of the resources are executable by the one or more processors to:

synchronize the respective availabilities of the resources at the set of multiple different disks in accordance with a global clock of the data management system, wherein the synchronizing is performed at a disk of the set of multiple different disks independently from other disks of the set of multiple different disks based at least in part on the global clock of the data management system.

20. The non-transitory computer-readable medium of claim 18, wherein the instructions to synchronize the respective availabilities of the resources are executable by the one or more processors to:

synchronize, across the set of multiple different disks during the time period based at least in part on the set of multiple different disks executing the first job, respective start times for a resource deposition periodicity, wherein disks of the set of multiple different disks deposit respective sets of resources within a threshold time period of one another based at least in part on synchronizing the respective start times for the resource deposition periodicity.

\* \* \* \* \*